United States Patent
Tsai et al.

(10) Patent No.: US 9,743,249 B2
(45) Date of Patent: Aug. 22, 2017

(54) USER EQUIPMENT, DEVICE TO DEVICE USER EQUIPMENT, BACKHAUL DEVICE AND POSITIONING METHOD THEREOF

(71) Applicant: Institute For Information Industry, Taipei (TW)

(72) Inventors: Yi-Hsueh Tsai, New Taipei (TW); Yi-Ting Lin, New Taipei (TW); Shu-Han Liao, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/993,784

(22) Filed: Jan. 12, 2016

(65) Prior Publication Data

US 2016/0227373 A1   Aug. 4, 2016

Related U.S. Application Data

(60) Provisional application No. 62/109,631, filed on Jan. 30, 2015, provisional application No. 62/141,278, filed on Apr. 1, 2015.

(51) Int. Cl.

| | |
|---|---|
| *H04W 4/02* | (2009.01) |
| *H04W 72/04* | (2009.01) |
| *H04W 24/10* | (2009.01) |
| *H04W 64/00* | (2009.01) |
| *G01S 5/00* | (2006.01) |
| *G01S 5/02* | (2010.01) |
| *H04W 92/18* | (2009.01) |

(52) U.S. Cl.
CPC ........... *H04W 4/025* (2013.01); *G01S 5/0072* (2013.01); *G01S 5/0284* (2013.01); *H04W 24/10* (2013.01); *H04W 64/00* (2013.01); *H04W 72/042* (2013.01); *H04W 72/0413* (2013.01); *H04W 92/18* (2013.01)

(58) Field of Classification Search
CPC ... H04W 4/025; H04W 72/042; H04W 24/10; H04W 72/0413
USPC .............................................. 455/456.1–457
See application file for complete search history.

(56) References Cited

U.S. PATENT DOCUMENTS

| | | | |
|---|---|---|---|
| 6,031,490 A | 2/2000 | Forssen et al. | |
| 7,039,418 B2 * | 5/2006 | Amerga | G01S 19/06 |
| | | | 342/450 |

(Continued)

FOREIGN PATENT DOCUMENTS

| | | |
|---|---|---|
| TW | 201448654 A | 12/2014 |
| WO | 2014129960 A1 | 8/2014 |

OTHER PUBLICATIONS

Office Action to the corresponding Taiwan Patent Application No. 105100378 rendered by the Taiwan Intellectual Property Office (TIPO) on Nov. 3, 2016, 5 pages.

*Primary Examiner* — Sharad Rampuria
(74) *Attorney, Agent, or Firm* — Skaar Ulbrich Macari, P.A.

(57) ABSTRACT

A user equipment (UE), a device to device (D2D) UE, a backhaul device and a positioning method thereof are provided. The D2D UE measures an uplink reference signal transmitted from the UE and generates an uplink measurement report message according to the measured uplink reference signal. The backhaul device receives the uplink measurement report message and determines location information on at least one of the UE and D2D UE based on the uplink measurement report message.

20 Claims, 26 Drawing Sheets

(56) References Cited

U.S. PATENT DOCUMENTS

| | | | |
|---|---|---|---|
| 8,265,044 B2* | 9/2012 | Zhang | H04B 7/2606 370/336 |
| 8,433,339 B2* | 4/2013 | Soliman | G01S 5/02 342/375 |
| 2010/0323720 A1* | 12/2010 | Jen | H04B 7/2606 455/456.1 |
| 2011/0212733 A1 | 9/2011 | Edge et al. | |
| 2012/0058775 A1 | 3/2012 | Dupray et al. | |
| 2012/0252474 A1 | 10/2012 | Tiirola et al. | |
| 2013/0045759 A1 | 2/2013 | Smith | |
| 2013/0252628 A1* | 9/2013 | Kuehnel | H04W 4/02 455/456.1 |
| 2015/0018017 A1 | 1/2015 | Jang et al. | |
| 2015/0351116 A1* | 12/2015 | Shoshan | H04B 7/15542 370/330 |
| 2016/0007152 A1 | 1/2016 | Johnsson | |
| 2016/0095080 A1* | 3/2016 | Khoryaev | G01S 5/0284 455/456.1 |
| 2016/0205717 A1* | 7/2016 | Kazmi | H04W 8/22 455/435.2 |
| 2016/0337805 A1* | 11/2016 | Liao | H04W 4/025 |

* cited by examiner

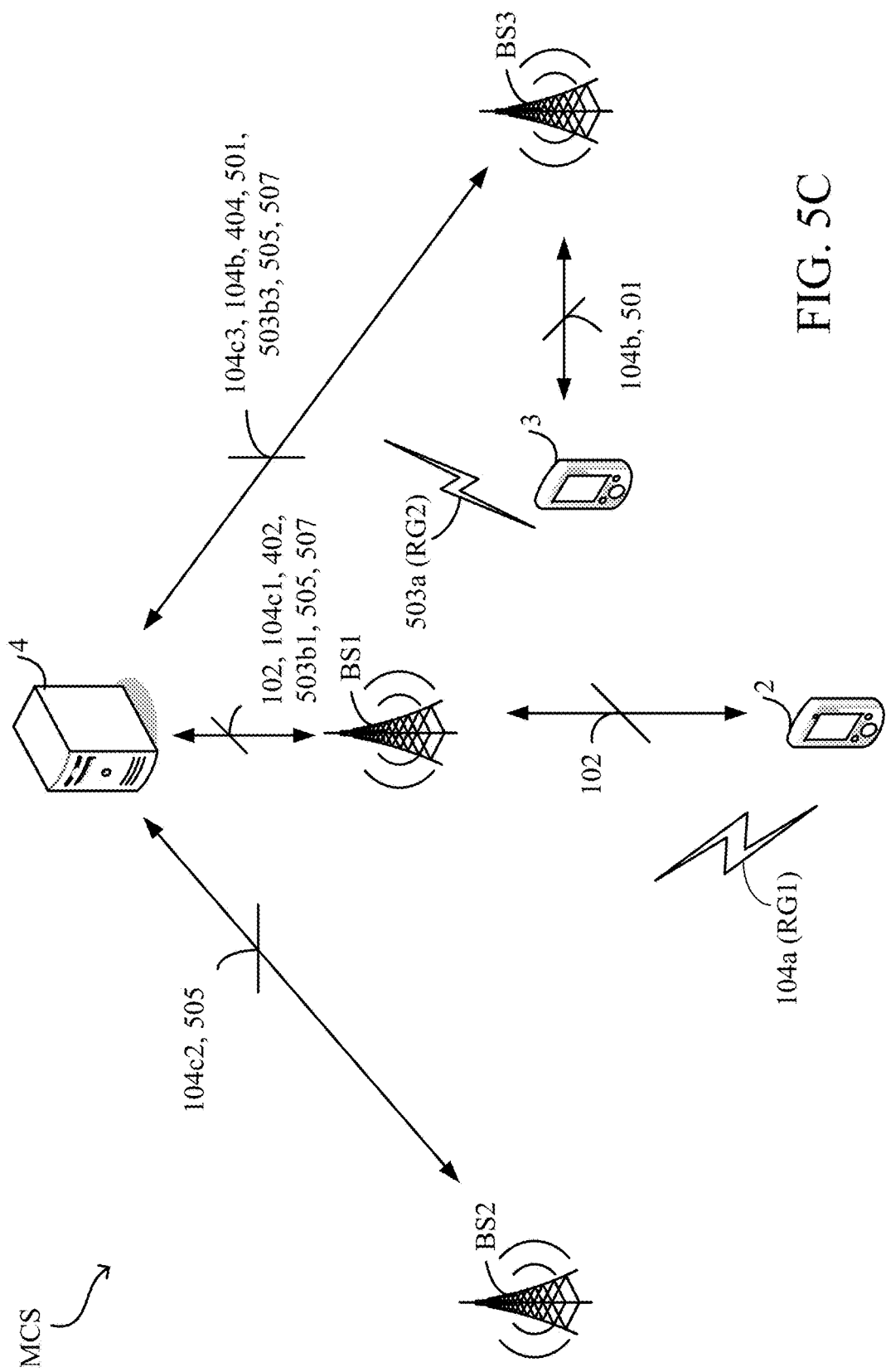

USER EQUIPMENT, DEVICE TO DEVICE USER EQUIPMENT, BACKHAUL DEVICE AND POSITIONING METHOD THEREOF

PRIORITY

This application claims the benefit of priority based on U.S. Provisional Application Ser. Nos. 62/109,631 filed on Jan. 30, 2015 and 62/141,278 filed on Apr. 1, 2015, which are hereby incorporated by reference herein in their entirety.

FIELD

The present invention relates to a user equipment (UE), a device to device (D2D) UE, a backhaul device and a positioning method thereof. More particularly, the D2D UE of the present invention measures an uplink reference signal transmitted by the UE and accordingly generates an uplink measurement report message, and the backhaul device decides location information of at least one of the UE and the D2D UE according to the uplink measurement report message.

BACKGROUND

With the rapid development of the wireless communication technology in recent years, communication network operators are already capable of providing various kinds of services and applications for users. For example, the user can make a voice call, make a video call, transmit a real-time message or the like via a mobile communication network by operating a UE. Meanwhile, with a plurality of surrounding base stations, the user can also obtain positioning information in real time to learn the location thereof.

A prerequisite for positioning the location of the user through the mobile communication network is that there shall be several base stations at known positions around the UE so that the backhaul device can position the location of the UE based on reference signal measurement results between the UE and these base stations. However, when the user is in an emergency situation and the user's location does not has insufficient base stations nearby, it will be impossible to accomplish positioning by operating the UE and via the mobile communication network.

Accordingly, an urgent need exists in the art to provide a positioning mechanism which allows the user to position the location of the UE via the mobile communication network even in cases where the number of surrounding base stations is insufficient.

SUMMARY

The disclosure includes a positioning mechanism. The positioning mechanism includes a D2D UE having a D2D transmission function to measure an uplink reference signal transmitted by a conventional UE (i.e., a UE not having the D2D transmission function) which then reports the measurement result to a backhaul device. Accordingly, even if the number of base stations surrounding the D2D UE/conventional UE is insufficient, positioning can also be performed by the backhaul device based on the measurement result of the reference signal between the D2D UE and the conventional UE in addition to the measurement results between the UE and the base stations.

The disclosure includes a user equipment (UE) for a mobile communication system. The mobile communication system comprises the UE, a device to device (D2D) UE, a base station (BS) and a backhaul device and defines an uplink resource and a downlink resource. The uplink resource is used by the UE and the D2D UE for an uplink signal transmission, and the downlink resource is used by the BS for a downlink signal transmission. The D2D UE has a D2D transmission capability that uses the uplink resource, and the UE does not have the D2D transmission capability that uses the uplink resource. The D2D UE is near to the UE. The BS connects to the backhaul device. The UE comprises a transceiver and a processor. The transceiver connects to the BS and is configured to receive a signal transmitting request message from the BS. The signal transmitting request message indicates an uplink resource region of the uplink resource. The processor is electrically connected to the transceiver and is configured to generate an uplink reference signal according to the signal transmitting request message and enable the transceiver to transmit the uplink reference signal in the uplink resource region. The D2D UE receives the uplink reference signal from the uplink resource region, measures the uplink reference signal to generate a D2D uplink measurement report message, and transmits the D2D uplink measurement report message to the backhaul device so that the backhaul device decides location information of at least one of the UE and the D2D UE according to the D2D uplink measurement report message.

The disclosure further includes a device to device (D2D) UE for a mobile communication system. The mobile communication system comprises the D2D UE, a UE, a BS and a backhaul device and defines an uplink resource and a downlink resource. The uplink resource is used by the UE and the D2D UE for an uplink signal transmission, and the downlink resource is used by the BS for a downlink signal transmission. The D2D UE is capable of D2D transmission through the uplink resource, and the UE is incapable of the D2D transmission through the uplink resource. The UE is near to the D2D UE. The BS connects to the backhaul device. The D2D UE comprises a transceiver and a processor. The transceiver connects to the BS and is configured to receive a first uplink reference signal from the UE via a first uplink resource region of the uplink resource. The UE receives a first signal transmitting request message and transmits the first uplink reference signal in the first uplink resource region according to the first uplink resource region indicated by the first signal transmitting request message. The processor is electrically connected to the transceiver and is configured to generate a D2D uplink measurement report message according to the first uplink reference signal and enables the transceiver to transmit the D2D uplink measurement report message to the backhaul device so that the backhaul device decides location information of at least one of the UE and the D2D UE according to the D2D uplink measurement report message.

The disclosure additionally includes a backhaul device for a mobile communication system. The mobile communication system comprises the backhaul device, a UE, a D2D UE and a BS and defines an uplink resource and a downlink resource. The uplink resource is used by the UE and the D2D UE for an uplink signal transmission, and the downlink resource is used by the BS for a downlink signal transmission. The D2D UE is capable of D2D transmission through the uplink resource, and the UE is incapable of the D2D transmission through the uplink resource. The UE is near to the D2D UE. The BS connects to the backhaul device. The backhaul device comprises a processing unit and a network unit. The network unit connects to the BS. The processing unit is configured to generate a measurement request message and enable the network unit to transmit the measurement request message to the BS so that the BS generates a first signal transmitting request message according to the measurement request message and transmits the first signal transmitting request message to the UE. The first signal transmitting request message indicates a first uplink resource region of the uplink resource so that the UE transmits a first uplink reference signal and the D2D UE receives and measures the first uplink reference signal to generate a first D2D uplink measurement report message. The network unit further receives the first D2D uplink measurement report message from the D2D UE. The processor unit further decides the location information of at least one of the UE and the D2D UE according to the first D2D uplink measurement report message.

The disclosure still further includes a positioning method for a backhaul device. The backhaul device is used in a mobile communication system. The mobile communication system comprises the backhaul device, a UE, a D2D UE, and a BS and defines an uplink resource and a downlink resource. The uplink resource is used by the UE and the D2D UE for an uplink signal transmission, and the downlink resource is used by the BS for a downlink signal transmission. The D2D UE is capable of D2D transmission through the uplink resource, and the UE is incapable of the D2D transmission through the uplink resource. The UE is near to the D2D UE. The BS connects to the backhaul device. The backhaul device comprises a network unit and a processing unit. The network unit is configured to connect to the BS. The positioning method is executed by the processing unit and comprises the following steps of: generating a measurement request message; enabling the network unit to transmit the measurement request message to the BS so that the BS generates a first signal transmitting request message according to the measurement request message and transmits the first signal transmitting request message to the UE, wherein the first signal transmitting request message indicates a first uplink resource region of the uplink resource so that the UE transmits a first uplink reference signal according to the first signal transmitting request message and the D2D UE receives and measures the first uplink reference signal to generate a first D2D uplink measurement report message; receiving the first D2D uplink measurement report message from the D2D UE via the network unit; and deciding the location information of at least one of the UE and the D2D UE according to the first D2D uplink measurement report message.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5A to FIG. 5C respectively illustrate implementations of different connection situations under a mobile communication system MCS according to the second embodiment of the present invention;

DETAILED DESCRIPTION

In the following description, the present invention will be explained with reference to certain example embodiments thereof. Certain example embodiments of the present invention include a user equipment (UE), a device to device (D2D) UE, and a backhaul device for a mobile communication system, and a positioning method thereof. It shall be appreciated that, these example embodiments of the present invention are not intended to limit the present invention to any particular examples, embodiments, environment, applications or implementations described in these embodiments. Therefore, description of these example embodiments is only for purpose of illustration rather than to limit the present invention, and the scope claimed in this application shall be governed by the claims.

In the following embodiments and the attached drawings, elements unnecessary to explain the example embodiments are omitted from depiction; and dimensional relationships among individual elements in the attached drawings are illustrated only for ease of understanding, but not to limit the actual scale.

Figure 1A:
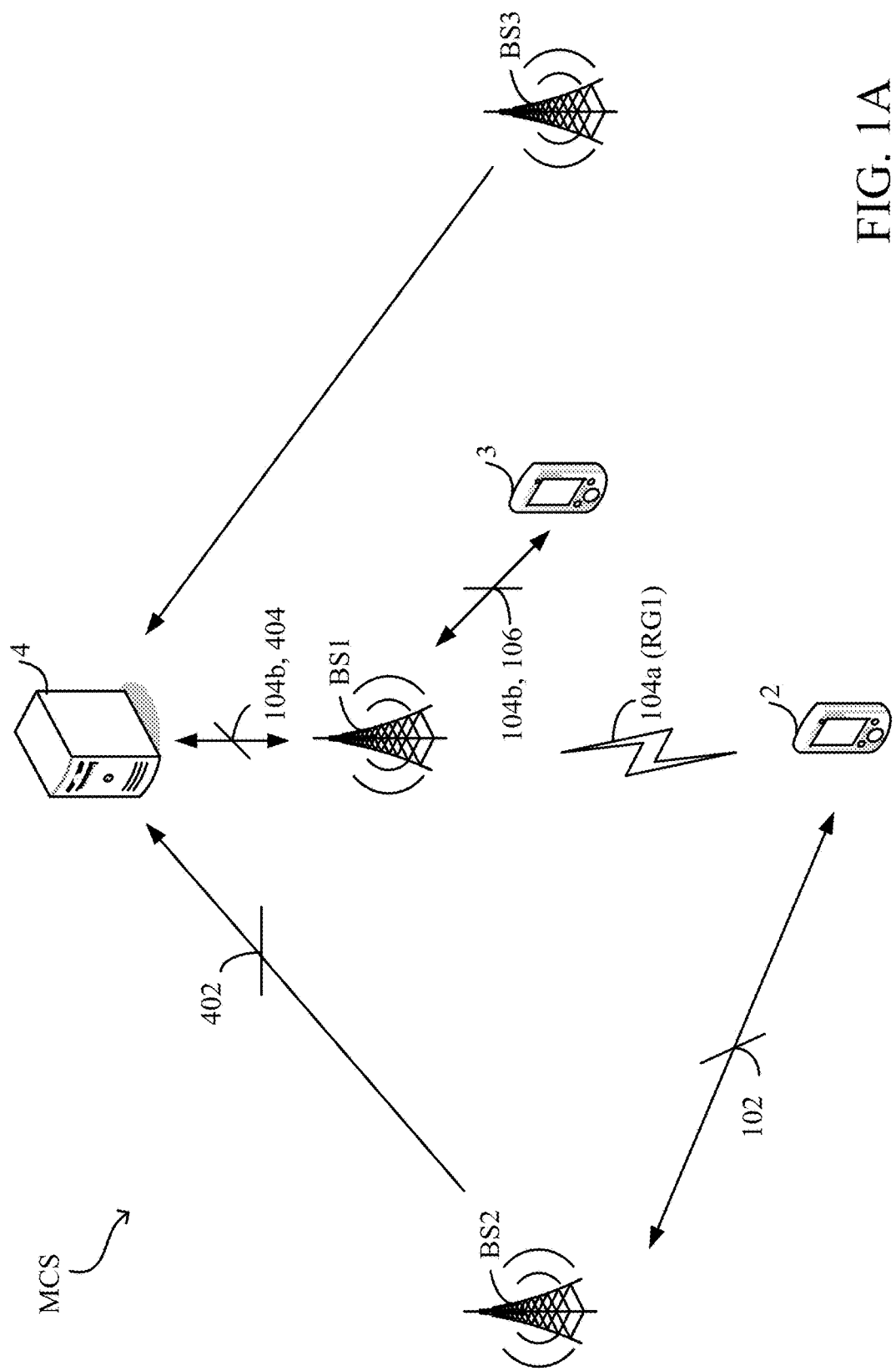
FIG. 1A is a schematic view depicting signal transmission between a user equipment (UE) 2, a D2D UE 3, base stations (BSs) BS1-BS3, and a backhaul device 4 comprised in a mobile communication system MCS according to the first embodiment of the present invention.
Figure 1B:
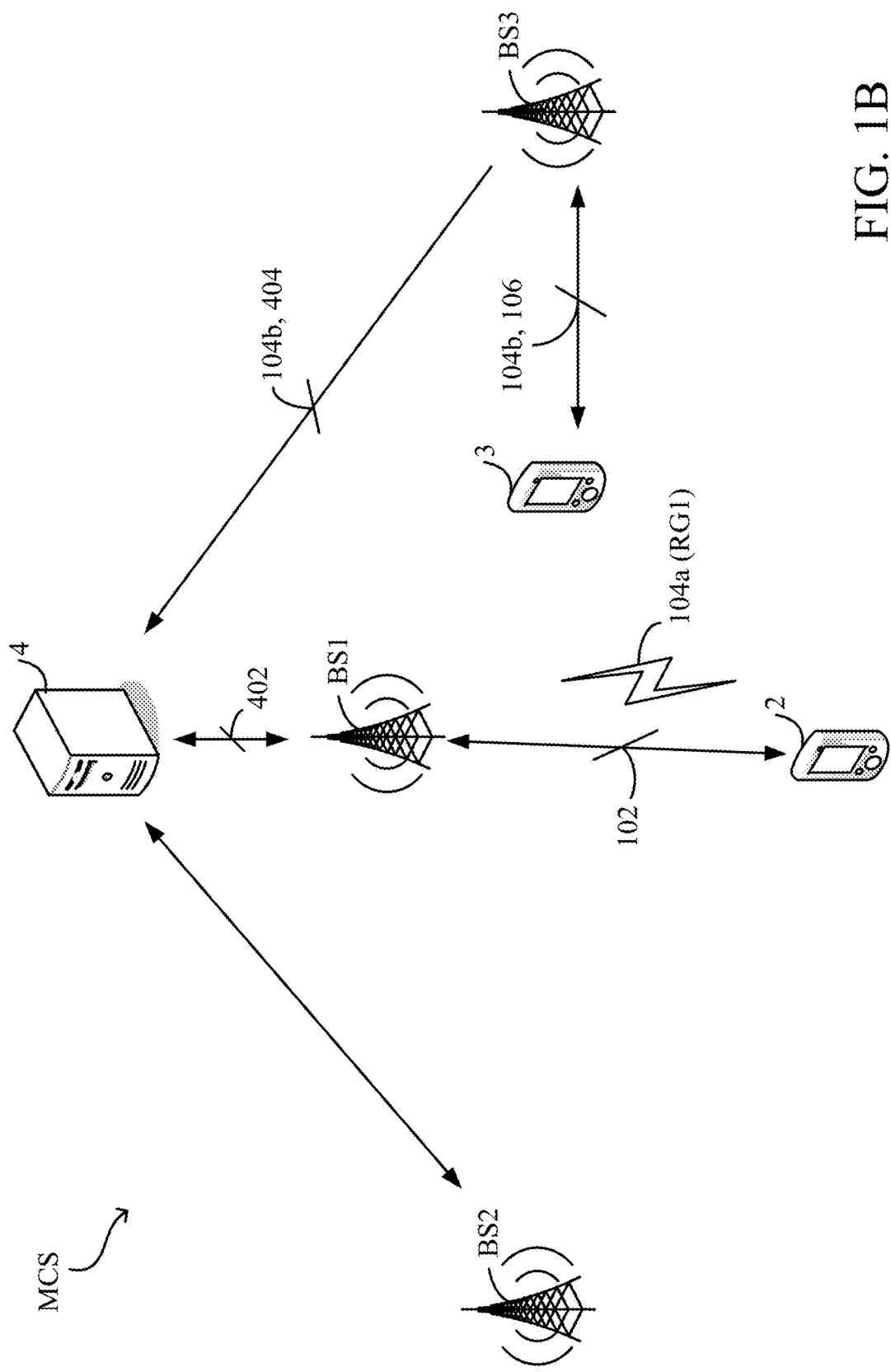
FIG. 1B is another schematic view depicting signal transmission between the UE 2, the D2D UE 3, the base stations BS1-BS3, and the backhaul device 4 comprised in the mobile communication system MCS according to the first embodiment of the present invention.

Please refer to FIG. 1A, FIG. 1B, and FIG. 2 to FIG. 4 for the first embodiment of the present invention. FIG. 1A is a schematic view depicting signal transmission between a user equipment (UE) 2, a D2D UE 3, base stations (BSs) BS1, BS2 and BS3, and a backhaul device 4 in a mobile communication system MCS. FIG. 1B is another schematic view depicting signal transmission between the UE 2, the D2D UE 3, the base stations (BSs) BS1, BS2 and BS3, and the backhaul device 4 in the mobile communication system MCS. The UE 2 is used in a mobile communication system MCS. The mobile communication system MCS comprises the UE 2, the D2D UE 3, the base stations BS1, BS2 and BS3, and the backhaul device 4. Moreover, the mobile communication system MCS further defines an uplink resource and a downlink resource.

In detail, the "uplink resource" described herein may be a combination of uplink resources of one or more frequency bands, and the "downlink resource" described herein may be a combination of downlink resources of one or more frequency bands. The aforesaid one or more frequency bands are the frequency bands to which one or more base stations in the mobile communication system MCS are allocated. The uplink resource is used by the UE and the D2D UE (e.g., the UE 2 and the D2D UE 3) for an uplink signal transmission, and the downlink resource is used by the BS (e.g., the base stations BS1, BS2 and BS3) for a downlink signal transmission. It shall be appreciated that, the base stations BS1, BS2 and BS3 may respectively be configured with uplink resources and downlink resources corresponding to different frequency bands. How different telecommunication operators configure the uplink resource and the downlink resource of a particular frequency band for use by a BS based on deployment of base stations shall be appreciated by those of ordinary skill in the art, so this will not be further described herein.

Each of the UE 2 and the D2D UE 3 may be a communication device, e.g., a mobile phone, a personal digital assistant, a tablet computer or other devices capable of mobile communication network connection and signal processing. It shall be noted that, in the present invention, the "D2D UE" refers to the communication device capable of D2D transmission through the uplink resource, and the UE 2 refers to the communication device incapable of the D2D transmission through the uplink resource. In other words, the D2D UE 3 can directly communicate with another D2D UE by using the uplink resource, and the UE 2 is incapable of direct communication. If the UE 2 wants to communicate with another communication device, then it can only communicate with the another communication device via a BS.

It is assumed that the D2D UE 3 is near to the UE 2 in all implementations of the present invention. The base stations BS1, BS2 and BS3 respectively connect to the backhaul device 4. The backhaul device 4 may be any network server or a combination of several network servers in a core network. In the present invention, each of the UE 2 and the D2D UE 3 may be positioned with the assistance of the surrounding base stations, and additionally, the D2D UE 3 may further measure an uplink reference signal 104*a* (also called a first uplink reference signal 104*a*) transmitted by the UE 2 so that the backhaul device 4 may further use the measurement result obtained by the D2D UE 3 to calculate the location of the UE 2 or the D2D UE 3.

If the UE 2 and/or the D2D UE 3 want(s) to use the positioning service, then each of the UE 2 and/or the D2D UE 3 transmits a positioning service request message (not shown) to the backhaul device 4 via the BS to which it is connected. For example, in FIG. 1A, the UE 2 connects to the base station BS2, and the D2D UE 3 connects to the base station BS1. When the UE 2 wants to use the positioning service, the UE 2 transmits a positioning service request message to the backhaul device 4 via the base station BS2. Moreover, when the D2D UE 3 wants to use the positioning service, the D2D UE 3 transmits a positioning service request message to the backhaul device 4 via the base station BS1. Accordingly, after receiving the positioning service request message from the UE 2 and/or the D2D UE 3, the backhaul device 4 generates and transmits a measurement request message 402 to the base station BS2 which the UE 2 connects to so that the base station BS2 transmits a signal transmitting request message 102 (also called a first signal transmitting request message 102) to the UE 2, thereby triggering the UE 2 to transmit the uplink reference signal 104*a*.

Furthermore, the backhaul device 4 further generates and transmits a measurement request message 404 to the base station BS1, which the D2D UE 3 connects to, so that the base station BS1 generates and transmits an uplink measurement request message 106 to the D2D UE 3, thereby triggering the D2D UE 3 to receive and measure the uplink reference signal 104*a* transmitted by the UE 2. Next, the D2D UE 3 generates a D2D uplink measurement report message 104*b* (also called a first D2D uplink measurement report message 104*b*) according to the measured uplink reference signal 104*a*, and transmits the D2D uplink measurement report message 104*b* to the backhaul device 4 via the base station BS1. In this way, the backhaul device 4 can further calculate the location of the UE 2 and/or the D2D UE 3 based on the D2D uplink measurement report message 104*b*.

It shall be appreciated that, the uplink measurement request message 106 may directly indicate an uplink resource region RG1 where the uplink reference signal 104*a* is transmitted by the UE 2 or instruct the D2D UE 3 to read from the signal transmitting request message 102 the uplink resource region RG1 which is allocated to the UE 2 to transmit the uplink reference signal 104*a*, so the D2D UE 3 may receive and measure the uplink reference signal 104*a* in the uplink resource region RG1. Furthermore, the uplink measurement request message 106 may further carry a reference signal sequence index corresponding to the uplink reference signal 104*a* to be measured by the D2D UE 3.

As is different from FIG. 1A, the UE 2 connects to the base station BS1 and the D2D UE 3 connects to the base station BS3 in FIG. 1B. In this case, when the UE 2 wants to acquire the positioning service, the UE 2 transmits the positioning service request message to the backhaul device 4 via the base station BS1; and when the D2D UE 3 wants to acquire the positioning service, the D2D UE 3 transmits the positioning service request message to the backhaul device 4 via the base station BS3.

The backhaul device 4 transmits the measurement request message 402 to the base station BS1 so that the base station BS1 transmits the signal transmitting request message 102 to the UE 2, thereby triggering the UE 2 to transmit the uplink reference signal 104*a*. Furthermore, the backhaul device 4 transmits the measurement request message 404 to the base station BS3 so that the base station BS3 transmits the uplink measurement request message 106 to the D2D UE 3, thereby triggering the D2D UE 3 to receive and measure the uplink reference signal 104*a* transmitted by the UE 2. Next, the D2D UE 3 transmits the D2D uplink measurement report message 104*b* to the backhaul device 4 via the base station BS3.

It shall be appreciated that, the mobile communication system MCS shown in FIG. 1A and FIG. 1B is only for ease of description, and the numbers of the base stations, the UEs and the D2D UEs comprised in the mobile communication system MCS are not intended to limit the present invention. Moreover, in other embodiments, the UE 2 and the D2D UE 3 may be connected to the same BS or be connected in any manner different from that of FIG. 1A and FIG. 1B. For example, if both the UE 2 and the D2D UE 3 connect to the base station BS1, then the backhaul device 4 transmits the measurement request message 402 and the measurement request message 404 to the base station BS1, and the base station BS1 transmits the signal transmitting request message 102 to the UE 2 according to the measurement request message 402, and transmits the uplink measurement request message 106 to the D2D UE 3 according to the measurement request message 404.

Figure 2:
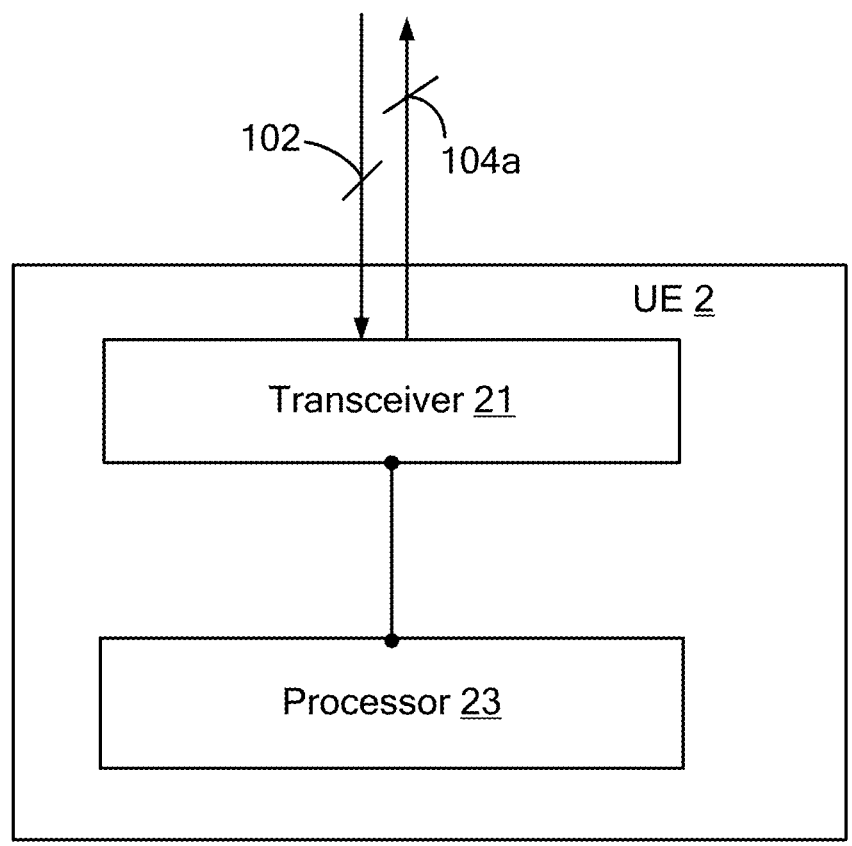
FIG. 2 is a schematic view of the UE 2 of the present invention.

In detail, FIG. 2 is a schematic view depicting the UE 2. The UE 2 comprises a transceiver 21 and a processor 23. The transceiver 21 connects to a BS (e.g., the base station BS2 of FIG. 1A or the base station BS1 of FIG. 1B), and is configured to receive the signal transmitting request message 102 from the BS. The signal transmitting request message 102 indicates an uplink resource region RG1 of the uplink resource, e.g., a resource region in an uplink subframe. The processor 23 is electrically connected to the transceiver 21, and is configured to generate the uplink reference signal 104a according to the signal transmitting request message 102 and enable the transceiver 21 to transmit the uplink reference signal 104a in the uplink resource region RG1.

For example, the uplink reference signal 104a may be a sounding reference signal (SRS), a demodulation reference signal (DMRS) or a combination thereof. Thus, the signal transmitting request message 102 may have parameters of the SRS (e.g., but not limited to, a reference signal sequence index, allocated subframe and subcarrier information, periodical information, a frequency hopping index, timing advance between base stations or the like) and parameters of the DMRS (e.g., an allocated resource block) recorded therein. Moreover, in other embodiments, the signal transmitting request message 102 of the present invention may further comprise an information measurement timing reference.

Thereafter, in response to the information carried in the uplink measurement request message 106, the D2D UE 3 receives and measures the SRS, the DMRS or the combination thereof to generate the D2D uplink measurement report message 104b and transmits the D2D uplink measurement report message 104b to the backhaul device 4 so that the backhaul device 4 decides location information of at least one of the UE 2 and the D2D UE 3 according to the D2D uplink measurement report message 104b.

Figure 3:
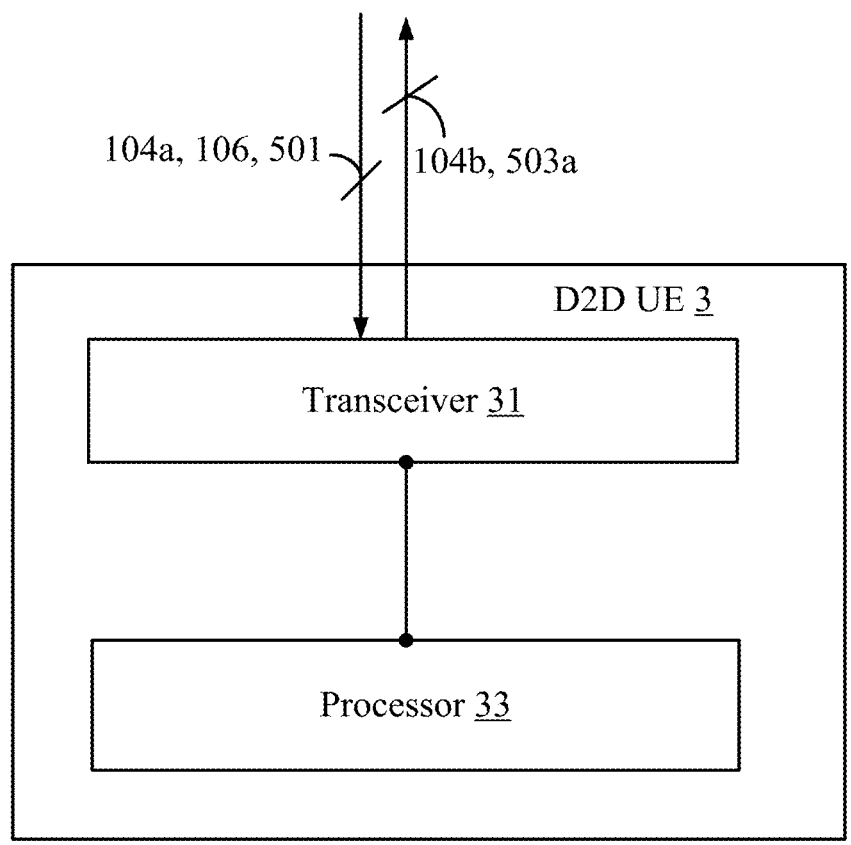
FIG. 3 is a schematic view of the D2D UE 3 of the present invention.

FIG. 3 is a schematic view depicting the D2D UE 3. The D2D UE 3 comprises a transceiver 31 and a processor 33. The D2D UE 3 connects to a BS (e.g., the base station BS1 shown in FIG. 1A or the base station BS3 shown in FIG. 1B) via the transceiver 31. The transceiver 31 receives the uplink reference signal 104a from the UE 2 via the uplink resource region RG1 of the uplink resource. The processor 33 electrically connects to the transceiver 31, and is configured to generate the D2D uplink measurement report message 104b according to the measured uplink reference signal 104a and enable the transceiver 31 to transmit the D2D uplink measurement report message 104b to the backhaul device 4.

Further speaking, the D2D UE 3 may learn that the uplink reference signal 104a will be transmitted in a particular uplink resource region RG1 of the uplink resource in response to the uplink measurement request message 106. Thus, after receiving the uplink reference signal 104a, the D2D UE 3 may accordingly calculate a time difference of arrival (TDOA) during which the uplink reference signal 104a is transmitted from the UE 2 to the D2D UE 3. How to calculate the TDOA according to the received uplink reference signal 104a shall be appreciated by those of ordinary skill in the art, and thus will not be further described herein. Moreover, even if the timings of the BS, the UE and the D2D UE in the mobile communication system MCS are asynchronous, those of ordinary skill in the art can still calculate the TDOA according to the received uplink reference signal 104a by using the conventional means to compensate for the influence caused by the asynchronous timing.

Additionally, after receiving the uplink reference signal 104a, the D2D UE 3 may further identify the UE 2 through the uplink reference signal 104a, record the UE index of the UE 2, and record the UE index and the TDOA into the D2D uplink measurement report message 104b. In this way, after receiving the D2D uplink measurement report message 104b, the backhaul device 4 may learn that the measurement result is obtained based on the uplink reference signal 104a transmitted by the UE 2 according to the UE index and the TDOA, and calculate a distance between the UE 2 and the D2D UE 3 based on the TDOA. Moreover, the D2D UE 3 may also record the information of the uplink resource region RG1 (e.g., a system frame number, a system subframe number or the like, i.e., reference signal configuration information) into the D2D uplink measurement report message 104b.

Additionally, the D2D UE 3 may also only record the time point at which the uplink reference signal 104a is received, and record the time point into the D2D uplink measurement report message 104b without calculating the TDOA during which the uplink reference signal 104a is transmitted from the UE 2 to the D2D UE 3. In other words, when the D2D uplink measurement report message 104b comprises the UE index and the time point at which the uplink reference signal 104a is received, the backhaul device 4 can calculate on its own the TDOA during which the uplink reference signal 104a is transmitted from the UE 2 to the D2D UE 3, and thus the calculation of the TDOA may be performed by the backhaul device 4.

It shall be appreciated that, if the backhaul device 4 wants to calculate the location information of the UE 2 or the D2D UE 3, sufficient measurement data need to be collected in fact in order to calculate the location information accurately. For example, the backhaul device 4 may trigger the base stations BS1-BS3 surrounding the UE 2 to measure the uplink reference signal 104a and transmit all the measurement results to the backhaul device 4. In this way, after receiving sufficient measurement data related to the UE 2 and/or the D2D UE 3, the backhaul device 4 can decide the location information of the UE 2 and/or the D2D UE 3. As can be known from this, the present invention provides a more flexible measurement report mechanism so that the positioning measurement is not limited by the number of the surrounding base stations; and thus, even if the number of the base stations surrounding the UE or the D2D UE to be positioned is insufficient, the backhaul device 4 may still calculate the positioning information with the assistance of the reference signal measurement report between the UE and the D2D UE.

Figure 4:
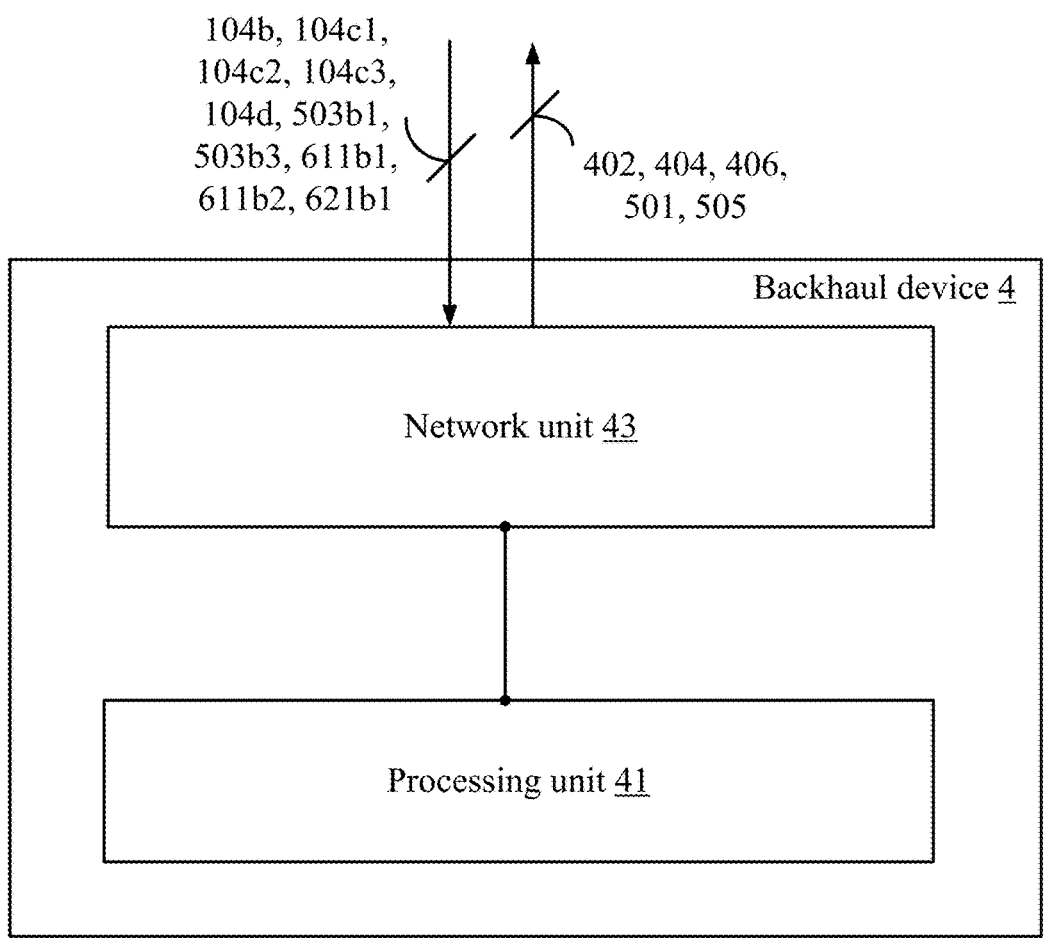
FIG. 4 is a schematic view of the backhaul device 4 of the present invention.

FIG. 4 is a schematic view depicting a backhaul device 4. The backhaul device 4 comprises a processing unit 41 and a network unit 43. As described earlier, the backhaul device 4 may be any network server or a combination of several network servers in a core network. When the backhaul device 4 is a single network server, the processing unit 41 is a processor, and the network unit 43 is a network interface. Moreover, when the backhaul device 4 is the combination of several network servers, the processing unit 41 is the combination of the processors of the network servers, and the network unit 43 is the combination of the network interfaces of the network servers.

The processing unit 41 is configured to generate a measurement request message 402 and/or a measurement request message 404. The network unit 43 connects to the base stations BS1-BS3 to transmit the measurement request message 402 and/or the measurement request message 404. In this way, the BS which the UE 2 connects to (e.g., the BS2 of FIG. 1A, and the BS1 of FIG. 1B) generates and transmits the signal transmitting request message 102 to the UE 2 according to the measurement request message 402 so as to trigger the UE 2 to transmit the uplink reference signal 104a.

It shall be noted that, when the backhaul device 4 wants to position the UE 2, or when the backhaul device 4 wants to position the D2D UE 3 with the assistance of the UE 2 near to the D2D UE 3, the backhaul device 4 generates the measurement request message 402 and enables the network unit 43 to transmit the measurement request message 402 to the BS which the UE 2 connects to. Accordingly, the BS allocates a particular resource region (the uplink resource region RG1) of the uplink resource based on the measurement request message 402 so that the UE 2 transmits the uplink reference signal 104a in the particular resource region. On the other hand, after receiving the measurement request message 402 or the measurement request message 404, the BS which the D2D UE 3 connects to may generate the uplink measurement request message 106 and transmit the uplink measurement request message 106 to the D2D UE 3. The D2D UE 3 measures the uplink reference signal 104a in response to the uplink measurement request message 106 and reports the measurement result to the backhaul device 4 (i.e., by transmitting the D2D uplink measurement report message 104b). In this way, after the network unit 43 of the backhaul device 4 receives the D2D uplink measurement report message 104b from the D2D UE 3, the processing unit 41 can calculate the location information of the UE 2 and/or the D2D UE 3 at least according to the measurement result reported by the D2D UE 3 (i.e., the D2D uplink measurement report message 104b).

Please refer to FIG. 2, FIG. 3, FIG. 4, FIG. 5A, FIG. 5B and FIG. 5C together for the second embodiment of the present invention. In this embodiment, the location information is calculated based on an uplink time difference of arrival (U-TDOA), and in the case that the calculation of the U-TDOA is performed by the backhaul device 4, only the time point at which the reference signal is received needs to be carried in each measurement report message. The backhaul device 4 of this embodiment triggers the UE and/or the D2D UE to transmit the uplink reference signal, and triggers the surrounding BSs and the D2D UE to measure the uplink reference signal and report the measurement results. For example, when the D2D UE 3 is to be positioned, the backhaul device 4 may trigger the UE 2 to transmit the uplink reference signal 104a and trigger the near BSs and D2D UE 3 to measure the uplink reference signal 104a transmitted by the UE 2.

It is assumed that the UE 2 currently connects to the base station BS2. In this case, the processing unit 41 of the backhaul device 4 further generates an uplink measurement request message 505 (also called a first uplink measurement request message 505) and enables the network unit 43 to transmit the uplink measurement request message 505 to the base station BS2 so that the base station BS2 measures the uplink reference signal 104a according to the uplink measurement request message 505.

After measuring the uplink reference signal 104a, the base station BS2 may generate a BS uplink measurement report message 104c2, and transmit the BS uplink measurement report message 104c2 to the backhaul device 4. Accordingly, the network interface 43 of the backhaul device 4 receives the BS uplink measurement report message 104c2 so that the processing unit 41 can decide the location information of at least one of the UE 2 and the D2D UE 3 according to the D2D uplink measurement report message 104b and the BS uplink measurement report message 104c2.

Figure 5A:
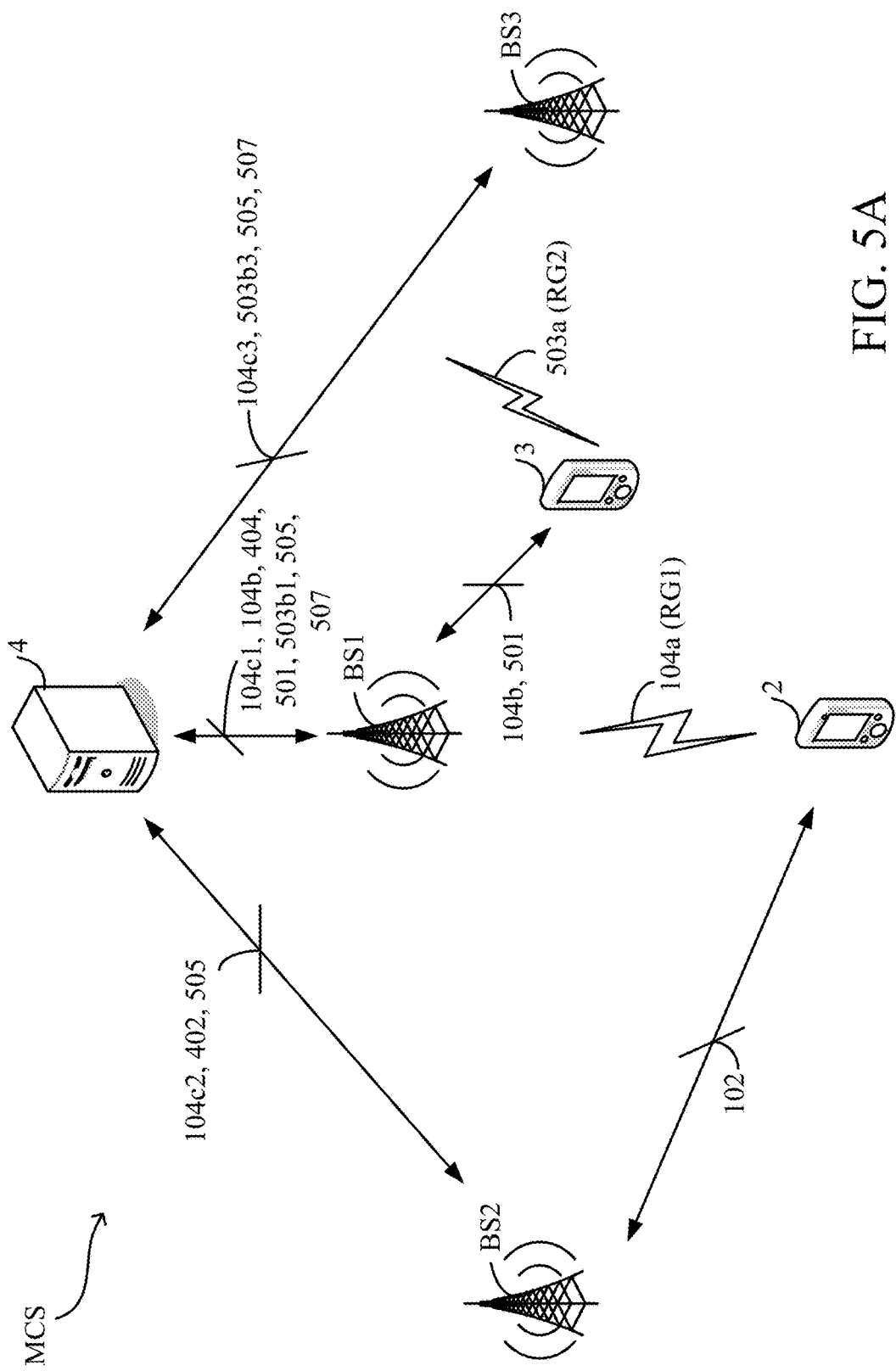

In this embodiment, the backhaul device 4 can trigger several surrounding base stations to measure the uplink reference signal 104a. For example, as shown in FIG. 5A, when the base station BS1 and the base station BS3 in the mobile communication system MCS are near to the UE 2, the processing unit 41 of the backhaul device 4 further enables the network unit 43 to transmit the uplink measurement request message 505 to the base station BS1 and the base station BS3. Next, the base station BS1 measures the uplink reference signal 104a according to the uplink measurement request message 505, and generates a BS uplink measurement report message 104c1 and transmits the BS uplink measurement report message 104c1 to the network unit 43.

Similarly, the base station BS3 can also measure the uplink reference signal 104a according to the uplink measurement request message 505, and generate a BS uplink measurement report message 104c3 and transmit the BS uplink measurement report message 104c3 to the network unit 43. In this way, the processing unit 41 can decide the location information of at least one of the UE 2 and the D2D UE 3 according to the D2D uplink measurement report message 104b, the BS uplink measurement report message 104c1, the BS uplink measurement report message 104c2 and the BS uplink measurement report message 104c3.

It shall be appreciated that, in this embodiment, the backhaul device 4 further decides the location information of the UE 2 and/or the D2D UE 3 according to the BS uplink measurement report messages transmitted back from three different base stations BS1-BS3. However, in other embodiments, the backhaul device 4 may decide the location of the communication device based on the BS uplink measurement report messages transmitted back from a different number of base stations. Further speaking, as can be readily appreciated by those of ordinary skill in the art based on the aforesaid description, for a UE or a D2D UE, when the quantity of the measurement data collected by the backhaul device 4 is larger than or equal to the variable quantity required for calculating the location information, the positioning may be completed, and the more measurement data the backhaul device 4 collects, the more accurate the positioning result may be.

Additionally, the backhaul device 4 may also trigger the D2D UE 3 to transmit an uplink reference signal so that the surrounding BS of the D2D UE 3 measures the uplink reference signal transmitted by the D2D UE 3 and reports the measurement result to the backhaul device 4 for positioning at least one of the UE 2 and the D2D UE 3. Furthermore, the BS which the D2D UE 3 connects to may be the same as or different from the BS which the UE 2 connects to.

Figure 5B:
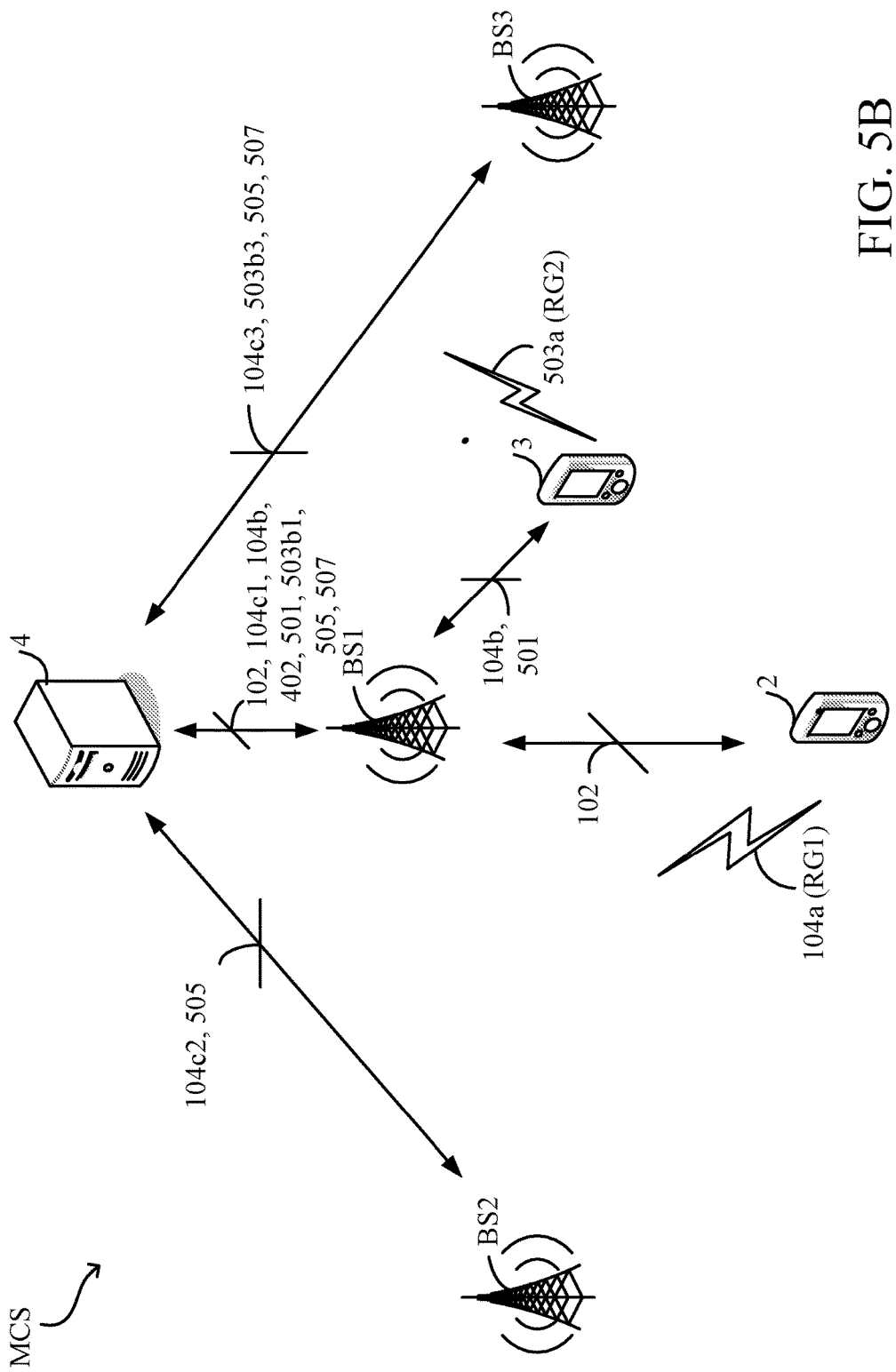

For example, FIG. 5A to FIG. 5C respectively illustrate implementations of different connection situations. In FIG. 5A, the UE 2 connects to the base station BS2, and the D2D UE 3 connects to the base station BS1. In FIG. 5B, both the UE 2 and the D2D UE 3 connect to the same base station BS1. In FIG. 5C, the UE 2 connects to the base station BS1, and the D2D UE 3 connects to the base station BS3. As can be appreciated by those of ordinary skill in the art, FIG. 5A, FIG. 5B and FIG. 5C are only used to describe different implementations and are not intended to limit the implementation of the present invention.

Further speaking, taking FIG. 5C as an exemplary example, the UE 2 connects to the base station BS1, and the D2D UE 3 connects to the base station BS3. The backhaul device 4 may directly transmit the measurement request message 404 to the base station BS3. Alternatively, when the base station BS1 may directly communicate with the base station BS3 via an X2 interface, the base station BS1 may transmit the measurement request message 404 to the base station BS3 via the X2 interface in response to the measurement request message 402, and thereby the base station BS3 may generate and transmit a signal transmitting request message 501 (also called a second signal transmitting request message 501) to the D2D UE 3.

Similarly, the signal transmitting request message 501 indicates an uplink resource region RG2 of the uplink resource (also called a second uplink resource region RG2). Next, after receiving the signal transmitting request message 501, the D2D UE 3 transmits an uplink reference signal 503a using the uplink resource region RG2. Accordingly, the backhaul device 4 further triggers the surrounding BSs near to the D2D UE 3 to measure the uplink reference signal 503a (also called a second uplink reference signal 503a) and report the measurement result to the backhaul device 4 for positioning the UE 2 and/or the D2D UE 3.

Likewise, the uplink reference signal 503a may be a sounding reference signal (SRS), a demodulation reference signal (DMRS) or a combination thereof. Thus, the signal transmitting request message 501 may have parameters of the SRS (e.g., but not limited to, a reference signal sequence index, allocated subframe and subcarrier information, periodical information, a frequency hopping index, timing advance between base stations or the like) and parameters of the DMRS (e.g., an allocated resource block) recorded therein. Moreover, in other embodiments, the signal transmitting request message 501 of the present invention may further comprise an information measurement timing reference. As can be appreciated by those of ordinary skill in the art, the uplink resource region RG2 may be the same as or different from the uplink resource region RG1 used by the UE 2 to transmit the uplink reference signal 104a depending on the actual resource configuration of each BS, and thus this will not be further described herein.

For example, still taking FIG. 5C as an exemplary example, the base station BS1 measures the uplink reference signal 104a in response to the uplink measurement request message 505 to generate a BS uplink measurement report message 104c1 (also called a first BS uplink measurement report message 104c1). Accordingly, after the network unit 43 of the backhaul device 4 receives the BS uplink measurement report message 104c1, the processing unit 41 can decide the location information of at least one of the UE 2 and the D2D UE 3 at least according to the D2D uplink measurement report message 104b and the BS uplink measurement report message 104c1.

Furthermore, when the base station BS3 is near to the UE 2, the base station BS3 measures the uplink reference signal 104a according to the uplink measurement request message 505 to generate a BS uplink measurement report message 104c3 (also called a second BS uplink measurement report message 104c3) and transmits the BS uplink measurement report message 104c3 to the backhaul device 4. In this way, after the network unit 43 of the backhaul device 4 receives the BS uplink measurement report message 104c1, the processing unit 41 can decide the location information of at least one of the UE 2 and the D2D UE 3 at least according to the D2D uplink measurement report message 104b, the BS uplink measurement report message 104c1 and the BS uplink measurement report message 104c3.

When the D2D UE 3 is near to the base station BS1, the processing unit 41 of the backhaul device 4 generates an uplink measurement request message 507 (also called a second uplink measurement request message 507), and enables the network unit 43 to transmit the uplink measurement request message 507 to the base station BS1. Thereafter, the base station BS1 measures the uplink reference signal 503a according to the uplink measurement request message 507, and generates and transmits a BS uplink measurement report message 503b1 (also called a third BS uplink measurement report message 503b1) to the backhaul device 4. Accordingly, after the network unit 43 of the backhaul device 4 receives the BS uplink measurement report message 503b1, the processing unit 41 can decide the location information of at least one of the UE 2 and the D2D UE 3 at least according to the D2D uplink measurement report message 104b, the BS uplink measurement report message 104c1 and the BS uplink measurement report message 503b1.

Furthermore, because the D2D UE 3 connects to the base station BS3, the D2D UE 3 is certainly near to the base station BS3. In this case, the processing unit 41 of the backhaul device 4 also generates and transmits the uplink measurement request message 507 to the base station BS3. Similarly, the base station BS3 measures the uplink reference signal 503a, and generates and transmits a BS uplink measurement report message 503b3 (also called a fourth BS uplink measurement report message 503b3) to the backhaul device 4. Accordingly, after the network unit 43 of the backhaul device 4 receives the BS uplink measurement report message 503b3, the processing unit 41 can decide the location information of at least one of the UE 2 and the D2D UE 3 at least according to the D2D uplink measurement report message 104b, the BS uplink measurement report message 104c1, the BS uplink measurement report message 503b1 and the BS uplink measurement report message 503b3.

In other words, in this embodiment, the backhaul device 4 may trigger the BSs near to the UE 2 and/or the BSs near to the D2D UE 3, uses the BSs near to the UE 2 (e.g., the base station BS1, the base station BS2 and the base station BS3 shown in FIG. 5A to FIG. 5C) to measure the uplink reference signal 104a, and/or uses the BSs near to the D2D UE 3 (e.g., the base station BS1 and the base station BS3 shown in FIG. 5A to FIG. 5C) to measure the uplink reference signal 503a, and the aforesaid base stations accordingly transmit all the measurement results back to the backhaul device 4. In this way, the backhaul device 4 can position the UE 2 and/or the D2D UE 3 according to all the measurement results.

It shall be appreciated that, the aforesaid first uplink measurement request message 505 is generated by the backhaul device 4 based on the BSs near to the UE 2 and is transmitted to the BSs near to the UE 2 so that the BSs near to the UE 2 measure the uplink reference signal 104a. The second uplink measurement request message 507 is generated by the backhaul device 4 based on the BSs near to the D2D UE 3 and is transmitted to the BSs near to the D2D UE 3 so that the BSs near to the D2D UE 3 measure the uplink reference signal 503a.

Further speaking, when the UE 2 is near to the base station BS2 and the base station BS3, the processing unit 41 of the backhaul device 4 may decide the location information of at least one of the UE 2 and the D2D UE 3 at least according to the D2D uplink measurement report message 104b, the BS uplink measurement report message 104c2 and the BS uplink measurement report message 104c3. When the UE 2 is near to the base station BS2 and the base station BS3 and the D2D UE 3 is near to the base station BS1, the processing unit 41 of the backhaul device 4 may decide the location information of at least one of the UE 2 and the D2D UE 3 at least according to the D2D uplink measurement report message 104b, the BS uplink measurement report message 104c2, the BS uplink measurement report message 104c3 and the BS uplink measurement report message 503b1.

When the UE 2 is near to the base station BS2 and the base station BS3 and the D2D UE 3 is near to the base station BS3, the processing unit 41 may decide the location information of at least one of the UE 2 and the D2D UE 3 at least according to the D2D uplink measurement report message 104b, the BS uplink measurement report message 104c2, the BS uplink measurement report message 104c3 and the BS uplink measurement report message 503b3. When the UE 2 is near to the base station BS2 and the base station BS3 and the D2D UE 3 is near to the base station BS1 the base station BS3, the processing unit 41 may decide the location information of at least one of the UE 2 and the D2D UE 3 at least according to the D2D uplink measurement report message 104b, the BS uplink measurement report message 104c2, the BS uplink measurement report message 104c3, the BS uplink measurement report message 503b1 and the BS uplink measurement report message 503b3.

It shall be appreciated that, FIG. 5A, FIG. 5B and FIG. 5C only respectively illustrate different implementations for ease of description of the implementation of this embodiment. However, as can be appreciated by those of ordinary skill in the art, the relationships between the UE 2, the D2D UE 3 and the near base stations thereof may be implemented in various ways. For example, in addition to the base station BS1 and the base station BS3 near to the D2D UE 3, there may be other base stations near to the D2D UE 3, and the other base stations near to the D2D UE 3 may also be triggered by the backhaul device 4 to measure the uplink reference signal 503a transmitted by the D2D UE 3 and report the measurement results (i.e., the BS uplink measurement report messages generated by the other base stations) to the backhaul device 4. Similarly, in addition to the base station BS1, the base station BS2 and the base station BS3 near to the UE 2, there may be other base stations near to the UE 2, so the backhaul device 4 may also trigger the other base stations near to the UE 2 to measure the uplink reference signal 104a transmitted by the UE 2. Accordingly, the backhaul device 4 may decide the location of the UE 2 and/or the D2D UE 3 according to all the collected measurement data.

On the other hand, as shown in FIG. 3, the transceiver 31 of the D2D UE 3 further receives the signal transmitting request message 501 from the backhaul device 4 via the BS which the D2D UE 3 connects to (e.g., the base station BS1 of FIG. 5B or the base station BS3 of FIG. 5C). As described earlier, the signal transmitting request message 501 indicates the second uplink resource region RG2 of the uplink resource, and the second uplink resource region RG2 is the same as/different from the uplink resource region RG1 used by the UE 2 for transmitting the uplink reference signal 104a.

The processor 33 of the D2D UE 3 generates the uplink reference signal 503a according to the signal transmitting request message 501, and enables the transceiver 31 to transmit the uplink reference signal 503a in the second uplink resource region RG2 so that the BS which the D2D UE 3 connects to (e.g., the base station BS1 of FIG. 5B or the base station BS3 of FIG. 5C) receives the uplink reference signal 503a from the second uplink resource region and measures the uplink reference signal 503a to generate the BS uplink measurement report message (e.g., 503b1 of FIG. 5B or 503b3 of FIG. 5C) and transmits the BS uplink measurement report message to the backhaul device 4.

Figure 6A:
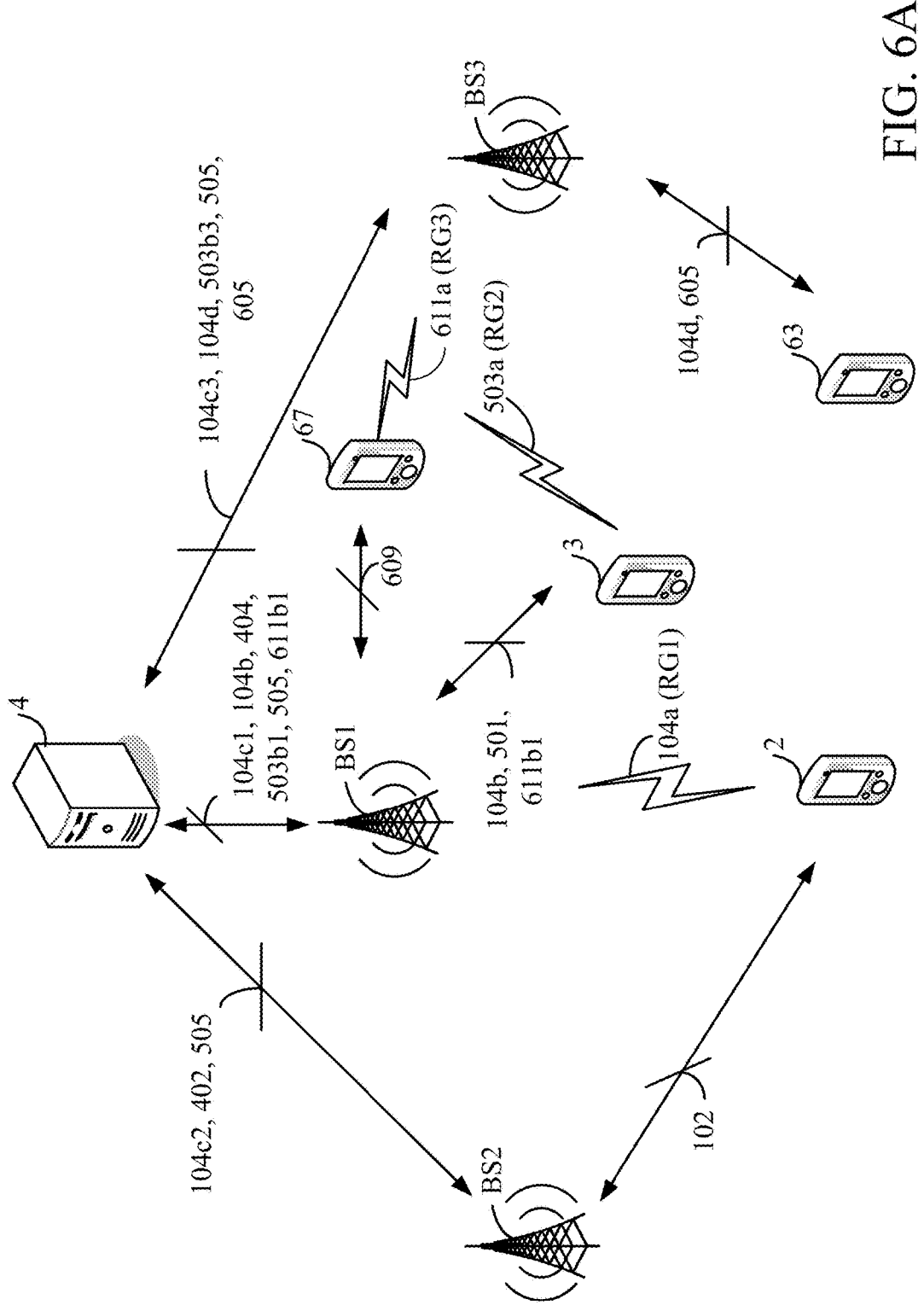
FIG. 6A and FIG. 6B respectively illustrate implementations of different connection situations under a mobile communication system MCS according to the third embodiment of the present invention.
Figure 6B:
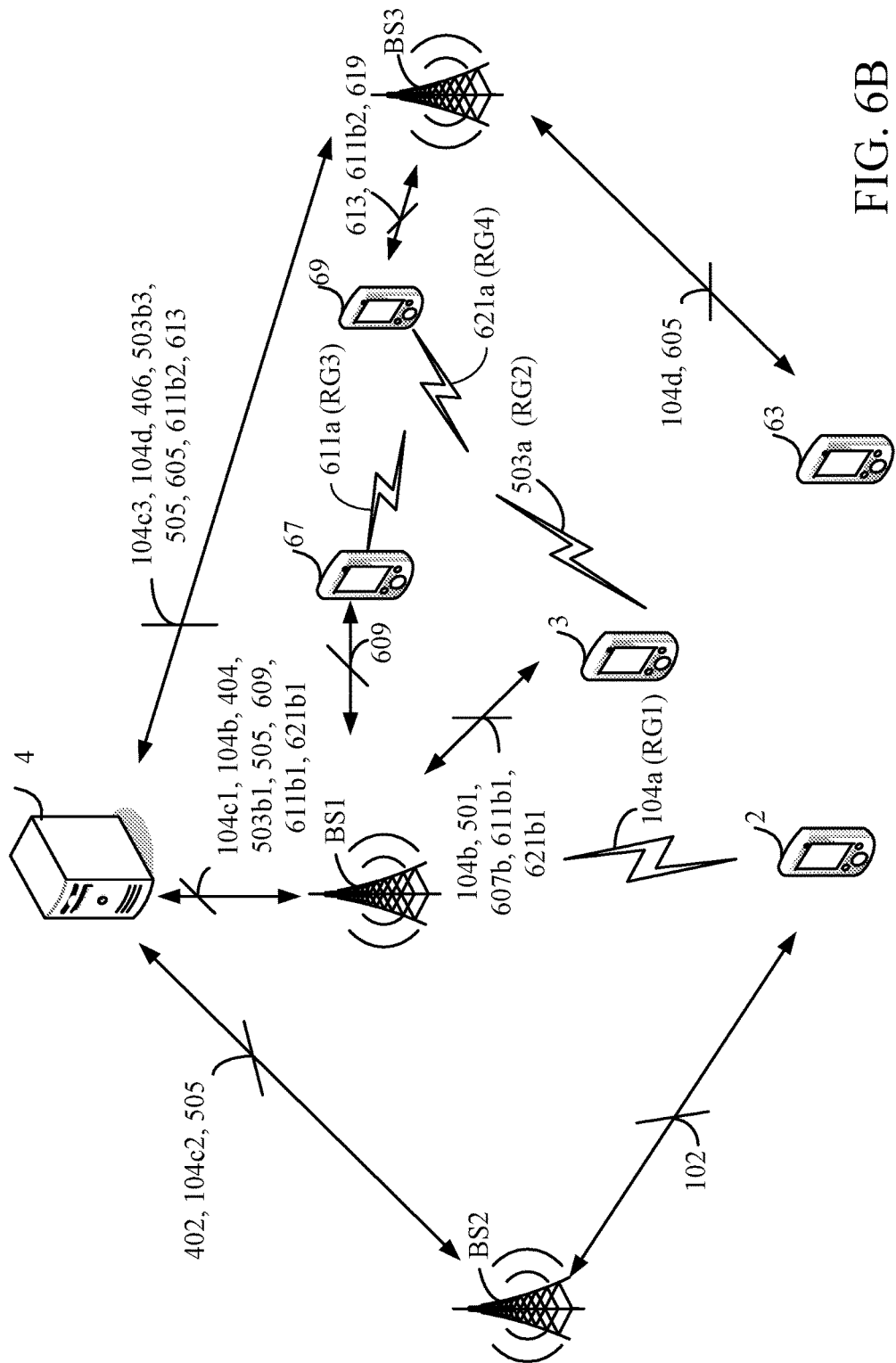

The third embodiment is an extension of the second embodiment, as shown in FIG. 4 and FIG. 6A to FIG. 6B. In this embodiment, the backhaul device 4 may further trigger other D2D UEs respectively near to the UE 2 and/or the D2D UE 3 to be positioned to measure the uplink reference signal. Moreover, the backhaul device 4 may also trigger the D2D UE assisting in positioning to collect/measure the uplink reference signals transmitted by other near UEs or D2D UEs, or trigger other D2D UEs near to the UE or the D2D UE that is assisting in positioning to measure the uplink reference signal for further positioning.

For example, as shown in FIG. 6A, when the mobile communication system MCS further comprises another D2D UE 63 near to the UE 2, the processing unit 41 of the backhaul device 4 may further select the D2D UE 63 from the D2D UEs within the signal coverage of the base station BS1 and within the signal coverage of the near base station BS3 (i.e., select the D2D UE near to the UE 2). Next, the processing unit 41 of the backhaul device 4 generates a measurement request message 406 and transmits the measurement request message 406 to the base station BS3 via the network unit 43 so that the base station BS3 generates and transmits an uplink measurement request message 605 to the D2D UE 63. After receiving the uplink measurement request message 605, the D2D UE 63 measures the uplink reference signal 104a transmitted by the UE 2 and generates a D2D uplink measurement report message 104d (also called a second D2D uplink measurement report message 104d) according to the uplink measurement request message 605.

It shall be appreciated that, the uplink measurement request message 605 may directly indicate the uplink resource region RG1 used by the UE 2 for transmitting the uplink reference signal 104a or instruct the D2D UE 63 to read from the signal transmitting request message 102 the uplink resource region RG1 which is allocated to the UE 2 to transmit the uplink reference signal 104a, so the D2D UE 63 may receive and measure the uplink reference signal 104a in the uplink resource region RG1. Thereafter, the D2D UE 63 transmits the D2D uplink measurement report message 104d to the backhaul device 4 so that the backhaul device 4 may decide the location information of at least one of the UE 2 and the D2D UE 3 at least according to the D2D uplink measurement report message 104b and the D2D uplink measurement report message 104d.

On the other hand, when the mobile communication system MCS further comprises another UE 67 near to the D2D UE 3, the processing unit 41 of the backhaul device 4 may further select the UE 67 from the UEs within the signal coverage of the base stations which the D2D UE 3 connects to or is near to. In the scenario illustrated in this embodiment, as shown in FIG. 6A, both the D2D UE 3 and the UE 67 connect to the base station BS1, so the backhaul device 4 selects the UE 67 within the signal coverage of the same connected BS. However, FIG. 6A only illustrates an implementation and is not intended to limit the present invention.

In this case, the base station BS1 which the D2D UE 3 connects to transmits a signal transmitting request message 609 to the UE 67 based on the measurement request message 404 received from the network unit 43 of the backhaul device 4. In other words, the base station BS1 transmits the signal transmitting request message 501 and the signal transmitting request message 609 to the D2D UE 3 and the UE 67 respectively based on the measurement request message 404.

Similarly, the signal transmitting request message 609 indicates an uplink resource region RG3 of the uplink resource so that the UE 67 can transmit an uplink reference signal 611a on the uplink resource region RG3. It shall be appreciated that, the uplink resource region RG3 used by the UE 67 may be the same as or different from the uplink resource region RG2. On the other hand, the backhaul device 4 also triggers the D2D UE 3 to measure the uplink reference signal 611a. In this way, the D2D UE 3 can receive the uplink reference signal 611a from the uplink resource region RG3 and measure the uplink reference signal 611a to generate a D2D uplink measurement report message 611b1 and transmit the D2D uplink measurement report message 611b1 to the backhaul device 4 so that the backhaul device 4 may further decide the location information of at least one of the UE 2 and the D2D UE 3 at least according to the D2D uplink measurement report message 104b and the D2D uplink measurement report message 611b1.

Additionally, as shown in FIG. 6B, when the mobile communication system MCS further comprises another D2D UE 69 near to the UE 67, the processing unit 41 of the backhaul device 4 further selects the D2D UE 69 and enables the network unit 43 to transmit the measurement request message 406 to the base station BS3 so that the base station BS3 generates and transmits an uplink measurement request message 613 to the D2D UE 69 based on the measurement request message 406. The D2D UE 69 measures the uplink reference signal 611a transmitted by the UE 67 according to the uplink measurement request message 613 to generate a D2D uplink measurement report message 611b2, and transmits the D2D uplink measurement report message 611b2 to the backhaul device 4 so that the backhaul device 4 further decides location information of at least one of the UE 2 and the D2D UE 3 according to the D2D uplink measurement report message 104b, the D2D uplink measurement report message 611b1 and the D2D uplink measurement report message 611b2.

Moreover, when the D2D UE 69 is near to the UE 3, the base station BS3 further transmits a signal transmitting request message 619 to the D2D UE 69 based on the measurement request message 406 received from the network unit 43 of the backhaul device 4. Similarly, the signal transmitting request message 619 indicates an uplink resource region RG4 of the uplink resource so that the D2D UE 69 can transmit an uplink reference signal 621a on the uplink resource region RG4. On the other hand, the backhaul device 4 also triggers the D2D UE 3 to measure the uplink reference signal 621a. In this way, the D2D UE 3 can receive the uplink reference signal 621a from the uplink resource region RG4 and measure the uplink reference signal 621a to generate a D2D uplink measurement report message 621b1 and transmit the D2D uplink measurement report message 621b1 to the backhaul device 4 so that the backhaul device 4 may further decide location information of at least one of the UE 2 and the D2D UE 3 at least according to the D2D uplink measurement report message 104b and the D2D uplink measurement report message 621b1.

It shall be appreciated that, the D2D uplink measurement report message and the BS uplink measurement report message described in the aforesaid embodiments all comprise the UE index and the time point of arrival of the received reference signal. Moreover, in other embodiments, the D2D uplink measurement report message and the BS uplink measurement report message may further comprise a measurement timing reference and received reference signal information (e.g., a system frame number, a system subframe number and signal reception quality).

The fourth embodiment of the present invention is as shown in FIG. 7 to FIG. 10. In the second embodiment and the third embodiment of the present invention, the reference signal is measured based on an uplink time difference of arrival (UTDOA) to thereby position at least one of the UE 2 and the D2D UE 3. However, in this embodiment, the reference signal is measured based on an observed time difference of arrival (OTDOA). Briefly speaking, the difference between this embodiment and the second and the third embodiments lies in that: the positioning information is calculated in the second and the third embodiments by using several base stations to measure the uplink reference signal transmitted by the UE or the D2D UE, while the positioning information is calculated in this embodiment by using the UE or the D2D UE to measure the downlink reference signal transmitted by the BSs.

Figure 7:
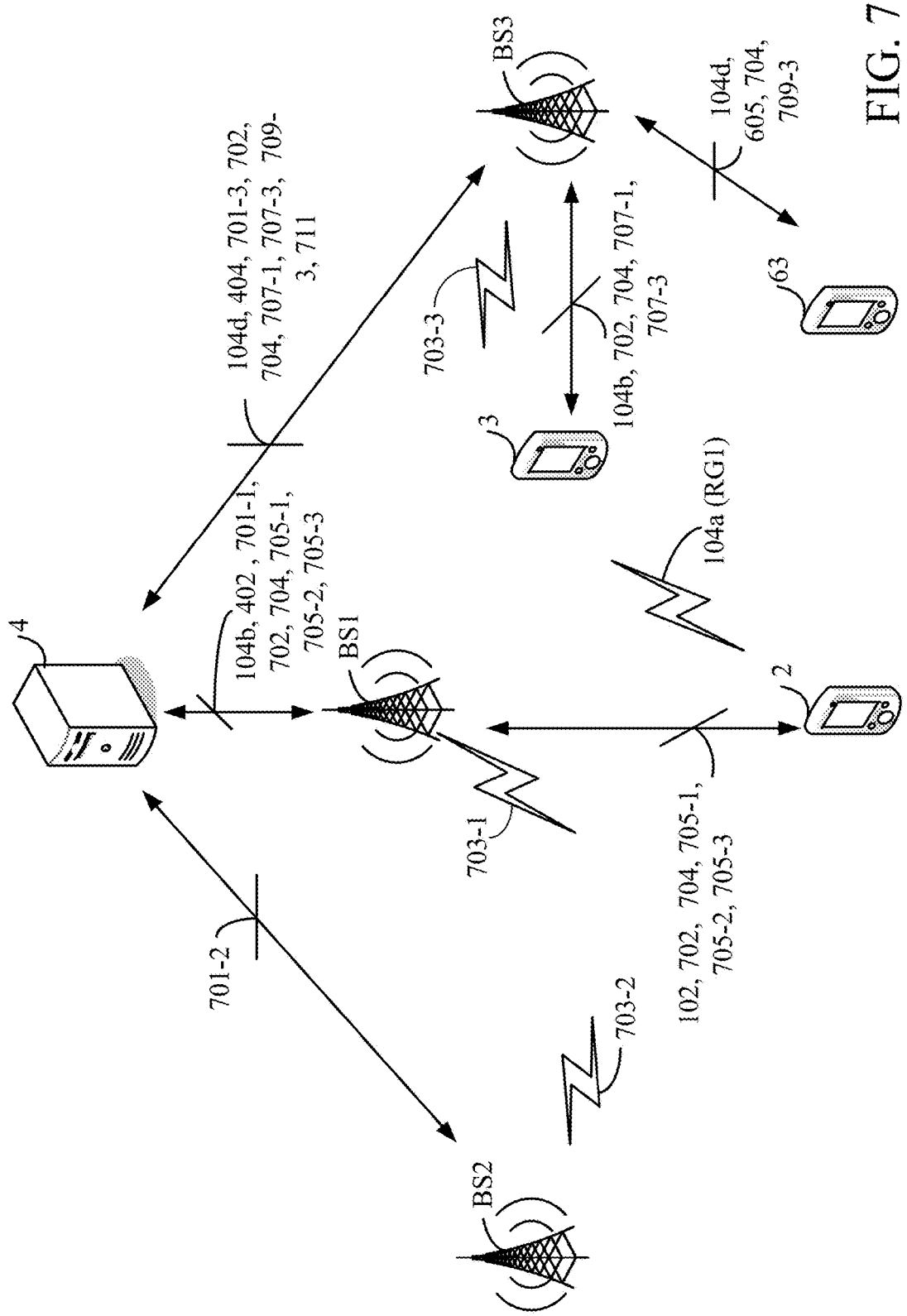
FIG. 7 illustrates an implementation of a mobile communication system MCS according to the fourth embodiment of the present invention.
Figure 10:
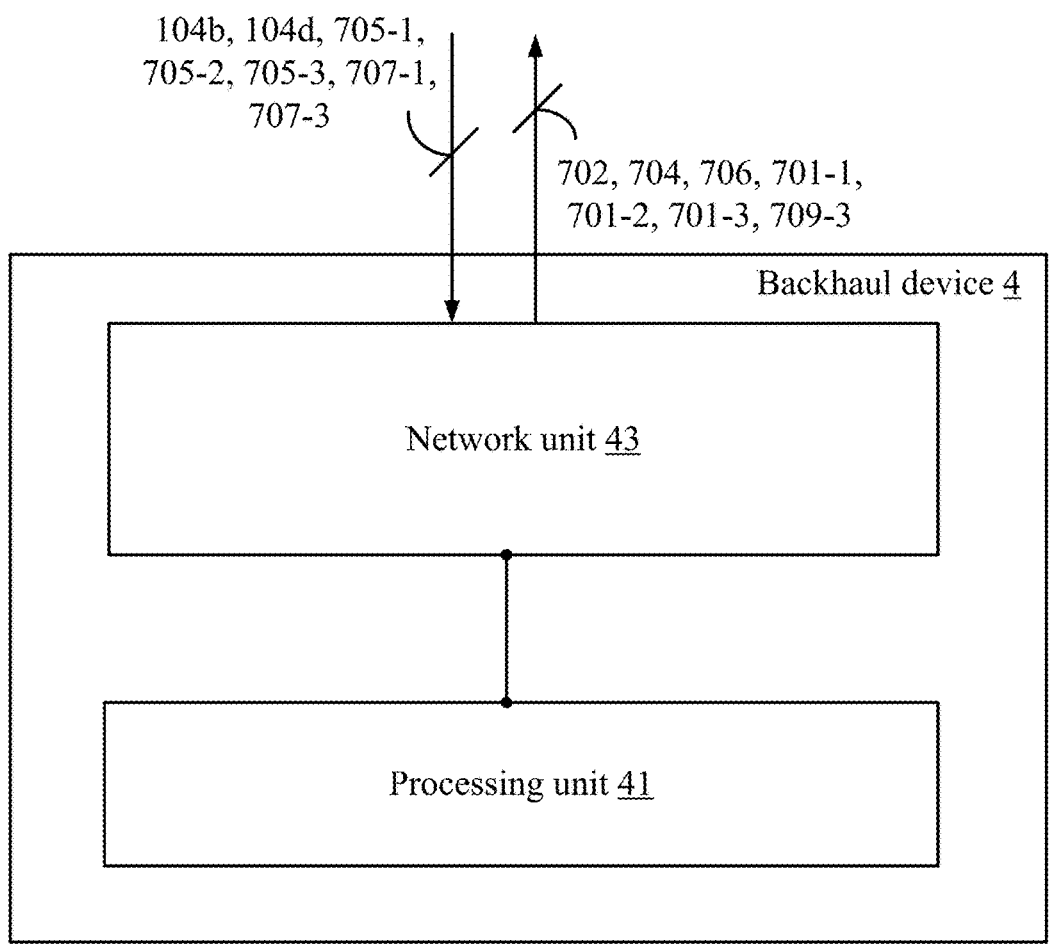
FIG. 10 is a schematic view of a backhaul device 4 according to the fourth embodiment of the present invention.

As shown in FIG. 7 and FIG. 10, if the UE 2 and/or the D2D UE 3 want(s) to acquire the positioning service, then the backhaul device 4 would trigger the BS near to the UE 2 and/or the BS near to the D2D UE 3 to transmit a downlink reference signal so that the UE 2 and/or the D2D UE 3 can measure the downlink reference signal of the respective near base stations and report the measurement result to the backhaul device 4. On the other hand, the UE or the D2D UE near to the UE 2 and/or the UE or the D2D UE near to the D2D UE 3 may also measure the downlink reference signal transmitted by the BSs, and similarly, report the measurement result to the backhaul device 4, and thereby the backhaul device 4 calculates the positioning information according to all the collected measurement data.

Specifically, in FIG. 7, the UE 2 connects to the base station BS1, and the D2D UE 3 connects to the base station BS3. As described earlier, the UE 2 transmits the uplink reference signal 104a in response to the signal transmitting request message 102, and the D2D UE 3 measures the uplink reference signal 104a and generates the D2D uplink measurement report message 104b. In this embodiment, after receiving the measurement request message 404 from the backhaul device 4, the base station BS1 further generates and transmits a downlink reference signal 703-1. The downlink reference signal 703-1 may be a cell-specific reference signal (CRS), a positioning reference signal (PRS) or any reference signal transmitted on the downlink resource and capable of being measured.

On the other hand, the processing unit 41 further generates a downlink measurement request message 702 and enables the network unit 43 to transmit the downlink measurement request message 702 to the UE 2 so that the UE 2 measures the downlink reference signal 703-1 according to the downlink measurement request message 702. In this way, the UE 2 can generate a downlink measurement report message 705-1 (also called a first downlink measurement report message 705-1) according to the measurement result and transmit the downlink measurement report message 705-1 to the backhaul device 4. After receiving the downlink measurement report message 705-1 via the network unit 43, the processing unit 41 further decides the location information of at least one of the UE 2 and the D2D UE 3 according to the D2D uplink measurement report message 104*b* and the downlink measurement report message 705-1.

Furthermore, when the D2D UE 3 is near to the base station BS1 which the UE 2 connects to, the processing unit 41 of the backhaul device 4 further enables the network unit 43 to transmit the downlink measurement request message 702 to the D2D UE 3, and the D2D UE 3 measures the downlink reference signal 703-1 according to the downlink measurement request message 702 to generate a D2D downlink measurement report message 707-1 (also called a first D2D downlink measurement report message 707-1) and transmits the D2D downlink measurement report message 707-1 to the backhaul device 4. After receiving the D2D downlink measurement report message 707-1 via the network unit 43, the processing unit 41 further decides the location information of at least one of the UE 2 and the D2D UE 3 according to the D2D uplink measurement report message 104*b*, the downlink measurement report message 705-1 and the D2D downlink measurement report message 707-1.

Additionally, when the base station BS3 is near to the UE 2, the backhaul device 4 may also transmit the signal transmitting request message 701-3 to the base station BS3 to trigger the base station BS3 to transmit a downlink reference signal 703-3. Similarly, the downlink reference signal 703-3 may also be a cell-specific reference signal (CRS), a positioning reference signal (PRS) or any reference signal transmitted on the downlink resource and capable of being measured. In this case, the processing unit 41 further generates a downlink measurement request message 704 and enables the network unit 43 to transmit the downlink measurement request message 704 to the UE 2 so that the UE 2 measures the downlink reference signal 703-3 according to the downlink measurement request message 704.

In this way, the UE 2 can generate a downlink measurement report message 705-3 (also called a second downlink measurement report message 705-3) according to the measurement result and transmit the downlink measurement report message 705-3 to the backhaul device 4. After receiving the downlink measurement report message 705-3 via the network unit 43, the processing unit 41 may further decide the location information of at least one of the UE 2 and the D2D UE 3 at least according to the D2D uplink measurement report message 104*b*, the downlink measurement report message 705-1 and the downlink measurement report message 705-3.

Moreover, when the D2D UE 3 is also near to the base station BS1, the processing unit 41 may further decide the location information of at least one of the UE 2 and the D2D UE 3 at least according to the D2D uplink measurement report message 104*b*, the downlink measurement report message 705-1, the downlink measurement report message 705-3 and the D2D downlink measurement report message 707-1.

Furthermore, because the D2D UE 3 connects to the base station BS3, the processing unit 41 of the backhaul device 4 further enables the network unit 43 to transmit the downlink measurement request message 704 to the D2D UE 3, and the D2D UE 3 receives and measures the downlink reference signal 703-3 according to the downlink measurement request message 704 to generate a D2D downlink measurement report message 707-3 (also called a second D2D downlink measurement report message 707-3) and transmits the D2D downlink measurement report message 707-3 to the backhaul device 4. Therefore, when the base station BS3 is near to the UE 2 and the D2D UE 3, the processing unit 41 receives the D2D downlink measurement report message 707-3 via the network unit 43, and then further decides the location information of at least one of the UE 2 and the D2D UE 3 according to the D2D uplink measurement report message 104*b*, the downlink measurement report message 705-1, the downlink measurement report message 705-3 and the D2D downlink measurement report message 707-3.

Moreover, when the D2D UE 3 is also near to the base station BS1, the processing unit 41 may further decide the location information of at least one of the UE 2 and the D2D UE 3 at least according to the D2D uplink measurement report message 104*b*, the downlink measurement report message 705-1, the downlink measurement report message 705-3, the D2D downlink measurement report message 707-1 and the D2D downlink measurement report message 707-3.

In the scenario of FIG. 7, in addition to the base stations BS1 and BS3, the backhaul device 4 may also transmit the signal transmitting request message 701-2 to the base station BS2 to trigger the base station BS2 to transmit the downlink reference signal 703-2. If the base station BS2 is near to the UE 2 (i.e., the UE 2 can receive the downlink reference signal 703-2 transmitted by the base station BS2), then the processing unit 41 of the backhaul device 4 further enables the network unit 43 to transmit the downlink measurement request message 706 to the UE 2. The UE 2 further receives and measures the downlink reference signal 703-2 according to the downlink measurement request message 706, and generates a downlink measurement report message 705-2 according to the measurement result. Finally, the UE 2 transmits all the measurement results (i.e., the downlink measurement report message 705-1, the downlink measurement report message 705-2 and the downlink measurement report message 705-3) to the backhaul device 4 via the base station BS1. In this way, the processing unit 41 may further decide the location information of at least one of the UE 2 and the D2D UE 3 according to the downlink measurement report message 705-2.

It shall be appreciated that, FIG. 7 is only used to illustrate an implementation and is not intended to limit the implementation of the present invention. Moreover, when the mobile communication system MCS further comprises the D2D UE 63 near to the UE 2, the D2D UE 63 not only can measure the uplink reference signal 104*a* transmitted by the UE 2 according to the uplink measurement request message 605 to generate the D2D uplink measurement report message 104*d* as described earlier, but also can further receive the downlink measurement request message 704 to measure the downlink reference signal 703-3 according to the downlink measurement request message 704. Next, the D2D UE 63 generates a D2D downlink measurement report message 709-3 according to the measurement result. Finally, the D2D UE 63 transmits the D2D downlink measurement report message 709-3 to the backhaul device 4 via the base station BS3. In this way, the processing unit 41 may further decide the location information of at least one of the UE 2 and the D2D UE 3 according to the D2D downlink measurement report message 709-3.

Further speaking, when the base station BS1 is near to the UE 2 and the D2D UE 3, the processing unit 41 of the backhaul device 4 may decide the location information of at least one of the UE 2 and the D2D UE 3 at least according to the D2D uplink measurement report message 104*b*, the downlink measurement report message 705-1 and the D2D downlink measurement report message 707-1. When both the base station BS1 and the base station BS3 are near to the UE 2, the processing unit 41 of the backhaul device 4 may decide the location information of at least one of the UE 2 and the D2D UE 3 at least according to the D2D uplink measurement report message 104b, the downlink measurement report message 705-1 and the downlink measurement report message 705-3.

Additionally, when the base station BS1 is near to the UE 2 and the D2D UE 3 and the base station BS3 is near to the UE 2, the processing unit 41 of the backhaul device 4 may decide the location information of at least one of the UE 2 and the D2D UE 3 at least according to the D2D uplink measurement report message 104b, the downlink measurement report message 705-1, the downlink measurement report message 705-3 and the D2D downlink measurement report message 707-1. When the base station BS1 is near to the UE 2 and the base station BS3 is near to the UE 2 and the D2D UE 3, the processing unit 41 of the backhaul device 4 may decide the location information of at least one of the UE 2 and the D2D UE 3 at least according to the D2D uplink measurement report message 104b, the downlink measurement report message 705-1, the downlink measurement report message 705-3 and the D2D downlink measurement report message 707-3.

Furthermore, when both the base station BS1 and the base station BS3 are near to the UE 2 and the D2D UE 3, the processing unit 41 of the backhaul device 4 may decide the location information of at least one of the UE 2 and the D2D UE 3 at least according to the D2D uplink measurement report message 104b, the downlink measurement report message 705-1, the downlink measurement report message 705-3, the D2D downlink measurement report message 707-1 and the D2D downlink measurement report message 707-3.

Figure 8:
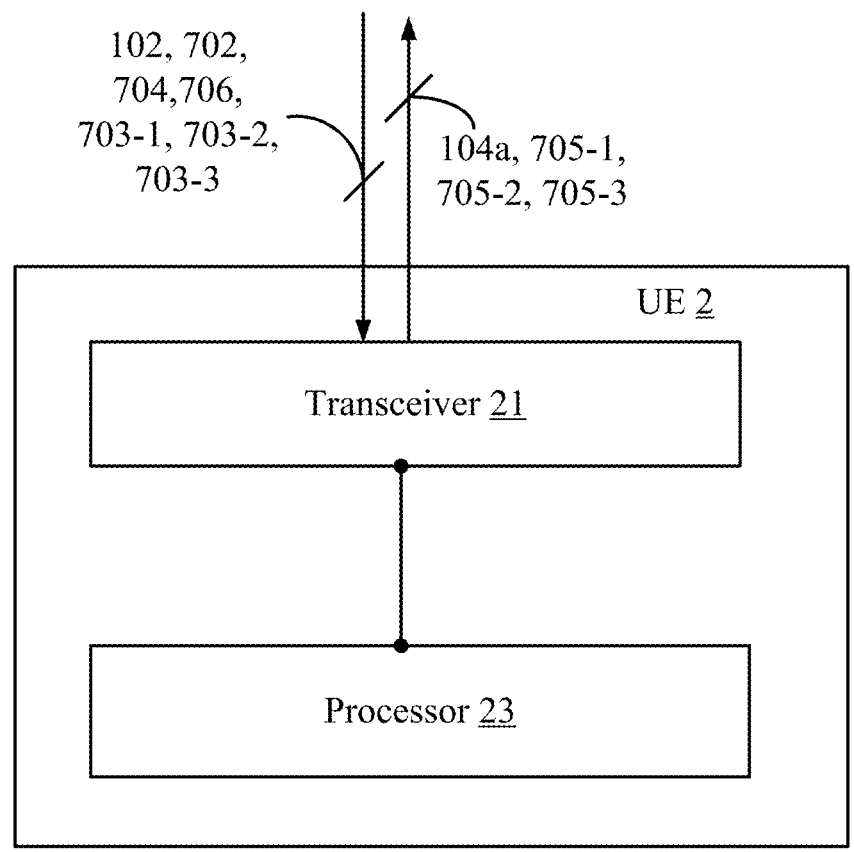
FIG. 8 is a schematic view of a UE 2 according to the fourth embodiment of the present invention.

FIG. 8 is a schematic view of the UE 2 of this embodiment. In the positioning measurement based on the OTDOA, the base station BS1 which the UE 2 connects to further transmits the downlink reference signal 703-1, so the transceiver 21 of the UE 2 further receives the downlink reference signal 703-1 from the base station BS1, and the processor 23 measures the downlink reference signal 703-1 to generate a downlink measurement report message 705-1 and enables the transceiver 21 to transmit the downlink measurement report message 705-1 to the backhaul device 4.

As described earlier, when the base station BS3 is near to the UE 2, the base station BS3 may transmit the downlink reference signal 703-3. In this case, the transceiver 21 of the UE 2 further receives the downlink reference signal 703-3 from the base station BS3, and the processor 23 measures the downlink reference signal 703-3 to generate the downlink measurement report message 705-3 and enables the transceiver 21 to transmit the downlink measurement report message 705-3 to the backhaul device 4. Additionally, when the base station BS2 is near to the UE 2, the base station BS2 may transmit the downlink reference signal 703-2. In this case, the transceiver 21 of the UE 2 further receives the downlink reference signal 703-2 from the base station BS2, and the processor 23 measures the downlink reference signal 703-2 to generate the downlink measurement report message 705-2 and enables the transceiver 21 to transmit the downlink measurement report message 705-2 to the backhaul device 4. Accordingly, the backhaul device 4 can decide the positioning information of the UE 2 and/or the D2D UE 3 according to all the received measurement results.

It shall be appreciated that, in this embodiment, the UE 2 generates measurement report messages respectively according to the measured downlink reference signals transmitted by the base stations near to the UE 2 and transmits the respective measurement report messages to the backhaul device 4. However, in other embodiments, the UE 2 may also record the results of measuring the downlink reference signals 703-1, 703-2 and 703-3 transmitted by all the base stations BS1 to BS3 into a single downlink measurement report message, and when the backhaul device 4 receives the single downlink measurement report message from the UE 2, the backhaul device 4 may read therefrom measurement results based on different base stations.

Figure 9:
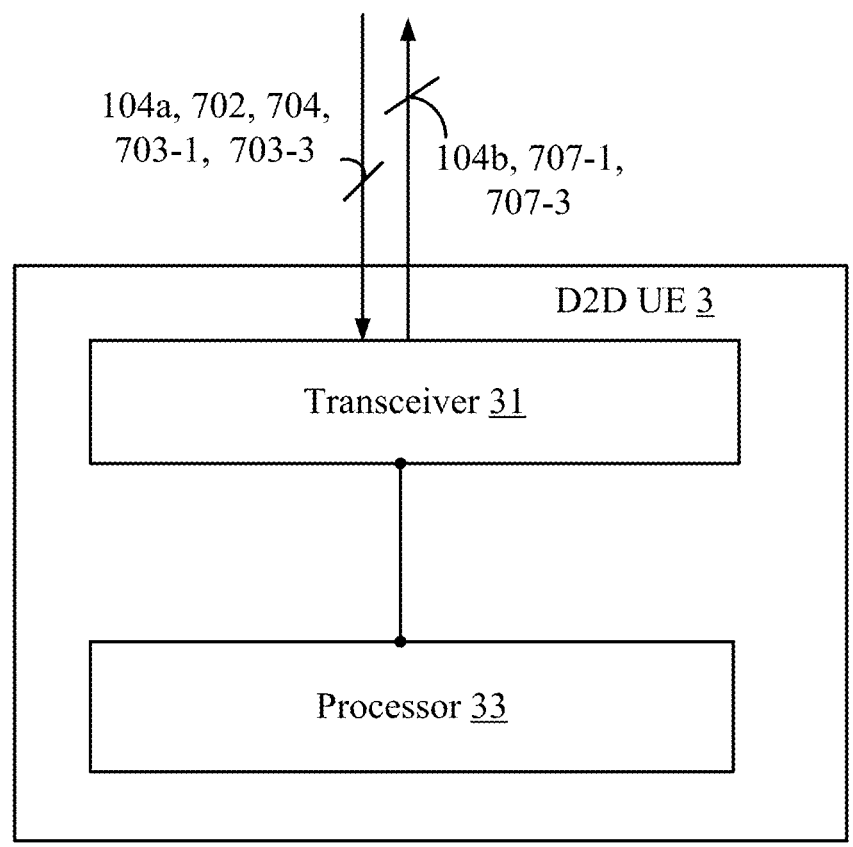
FIG. 9 is a schematic view of a D2D UE 3 according to the fourth embodiment of the present invention.

FIG. 9 is a schematic view of the D2D UE 3 of this embodiment. When the base station BS3 which the D2D UE 3 connects to further transmits the downlink reference signal 703-3, the transceiver 31 of the D2D UE 3 further receives the downlink reference signal 703-3 from the base station BS3, and the processor 33 measures the downlink reference signal 703-3 to generate the D2D downlink measurement report message 707-3 and enables the transceiver 31 to transmit the D2D downlink measurement report message 707-3 to the backhaul device 4 so that the backhaul device 4 decides the location information of at least one of the UE 2 and the D2D UE 3 according to all the received relevant measurement report messages.

As described earlier, when the base station BS1 is near to the D2D UE 3, the base station BS1 may further be triggered by the backhaul device 4 to transmit the downlink reference signal 703-1, the transceiver 31 of the D2D UE 3 further receives the downlink reference signal 703-1 from the base station BS1, and the processor 33 measures the downlink reference signal 703-1 to generate the D2D downlink measurement report message 707-1 and enables the transceiver 31 to transmit the D2D downlink measurement report message 707-1 to the backhaul device 4 so that the backhaul device 4 may further decide the location information of at least one of the UE 2 and the D2D UE 3 according to all the relevant measurement results.

It shall be appreciated that, in the positioning measurement based on the OTDOA in this embodiment, the backhaul device 4 may also further trigger the UE or the D2D UE near to the UE 2 and/or the UE or the D2D UE near to the D2D UE 3 to measure the downlink reference signals transmitted by the base stations so that the measurement results are reported to the backhaul device 4. Moreover, the aforesaid second and third embodiments and this embodiment (the fourth embodiment) may each have various aspects and applications, and contents of different embodiments may be combined in various ways into various implementations.

For example, in an implementation, the first embodiment, the second embodiment and the fourth embodiment are combined together in the present invention. In detail, if the D2D UE 3 wants to acquire a positioning service, then the backhaul device 4 may generally determine which base stations are near to the D2D UE 3 according to the BS which the D2D UE 3 connects to, and thereby triggers the base stations near to the D2D UE 3 to transmit the downlink reference signals and triggers the D2D UE 3 to measure the downlink reference signals transmitted by the base stations near to the D2D UE 3 and report the measurement results to the backhaul device 4. Next, the backhaul device 4 selects the UE 2 near to the D2D UE 3 and triggers the UE 2 to transmit the uplink reference signal. Then, the backhaul device 4 triggers the near base stations and the D2D UE 3 to measure the uplink reference signal transmitted by the UE 2 so that the near base stations and the D2D UE 3 respectively report the measurement results to the backhaul device 4. Accordingly, the backhaul device 4 can decide the D2D UE 3 according to the received relevant measurement results.

It shall be appreciated that, the above description only illustrates a possible implementation and is not intended to limit the present invention. Moreover, as described earlier, the backhaul device 4 may trigger several UEs and/or D2D UEs near to the D2D UE 3, and may also trigger several UEs or D2D UEs that are further from the D2D UE 3 to respectively measure and report an uplink reference signal and/or to respectively measure and report a downlink reference signal. In this way, the backhaul device 4 not only can use the near base stations to obtain the measurement results, but also can collect the measurement results obtained by the near UEs or D2D UEs, thereby calculating the positioning information. On the other hand, the order in which the positioning triggering is executed is not limited in the present invention. In other words, in another implementation, the backhaul device 4 may first trigger the UE 2 to transmit the uplink reference signal and then trigger the base stations near to the D2D UE 3 to transmit the downlink reference signals.

As another example, in another implementation, the first embodiment and the fourth embodiment may be combined together. If the D2D UE 3 wants to acquire a positioning service, then the backhaul device 4 may generally determine which base stations are near to the D2D UE 3 according to the BS which the D2D UE 3 connects to, and thereby triggers the base stations near to the D2D UE 3 to transmit the downlink reference signals and triggers the D2D UE 3 to measure the downlink reference signals transmitted by the base stations near to the D2D UE 3 and report the measurement results to the backhaul device 4. Next, the backhaul device 4 selects the UE 2 near to the D2D UE 3 and triggers the UE 2 to measure the downlink reference signals transmitted by the BSs near to the UE 2. Similarly, the measurement result obtained by the UE 2 is reported to the backhaul device 4. On the other hand, the backhaul device 4 further triggers the UE 2 to transmit the uplink reference signal, and triggers the D2D UE 3 to measure the uplink reference signal and report the measurement result to the backhaul device 4. Accordingly, the backhaul device 4 can decide the location of the D2D UE 3 based on all the received relevant measurement results.

As a further example, in another implementation, the first embodiment and the fourth embodiment are combined together. If the UE 2 wants to acquire a positioning service, then the backhaul device 4 may generally determine which base stations are near to the UE 2 according to the BS which the UE 2 connects to, and thereby triggers the base stations near to the UE 2 to transmit the downlink reference signals and triggers the UE 2 to measure the downlink reference signals transmitted by the base stations near to the UE 2, and then the UE 2 reports the measurement results to the backhaul device 4. Next, the backhaul device 4 selects the D2D UE 3 near to the UE 2 and triggers the D2D UE 3 to measure the downlink reference signals transmitted by the BSs near to the D2D UE 3, and then the D2D UE 3 reports the measurement results to the backhaul device 4. On the other hand, the backhaul device 4 further triggers the UE 2 to transmit the uplink reference signal, and triggers the D2D UE 3 to measure the uplink reference signal and report the measurement result to the backhaul device 4. Accordingly, the backhaul device 4 can decide the location of the UE 2 based on all the received relevant measurement results. In other words, the difference between this implementation and the previous implementation only lies in that: in this implementation, the UE 2 is to acquire the positioning service; while in the previous implementation, the D2D UE 3 is to acquire the positioning service.

As a further example, in another implementation, the first embodiment and the second embodiment are combined together. In detail, if the UE 2 wants to acquire a positioning service, then the backhaul device 4 triggers the UE 2 to transmit the uplink reference signal. Next, the backhaul device 4 triggers the BSs near to the UE 2 to measure the uplink reference signal transmitted by the UE 2 and transmit the measurement results back to the backhaul device 4. On the other hand, the backhaul device 4 selects the D2D UE 3 near to the UE 2, and also triggers the D2D UE 3 to measure the uplink reference signal transmitted by the UE 2 and then the D2D UE 3 transmits the measurement result back to the backhaul device 4. Moreover, the backhaul device 4 also triggers the D2D UE 3 to transmit the uplink reference signal, and triggers the near BSs to measure the uplink reference signal transmitted by the D2D UE 3 and then the near BSs transmit the measurement results back to the backhaul device 4. In this way, the backhaul device 4 can decide the positioning information of the UE 2 according to the received relevant measurement results.

As a further example, similarly, the first embodiment and the second embodiment are combined together in another implementation. In detail, if the D2D UE 3 wants to acquire a positioning service, then the backhaul device 4 triggers the D2D UE 3 to transmit the uplink reference signal. Next, the backhaul device 4 triggers the BSs near to the D2D UE 3 to measure the uplink reference signals transmitted by the D2D UE 3 and then the BSs near to the D2D UE 3 transmit the measurement results back to the backhaul device 4. On the other hand, the backhaul device 4 selects the UE or the D2D UE near to the D2D UE 3, triggers the selected near UE or D2D UE to transmit the uplink reference signal, and triggers the D2D UE 3 and the near BSs to measure the uplink reference signal transmitted by the selected near UE or D2D UE. Finally, the D2D UE 3 and the near BSs respectively transmit the measurement results back to the backhaul device 4. In this way, the backhaul device 4 can decide the positioning information of the D2D UE 3 according to the received relevant measurement results.

Figure 11:
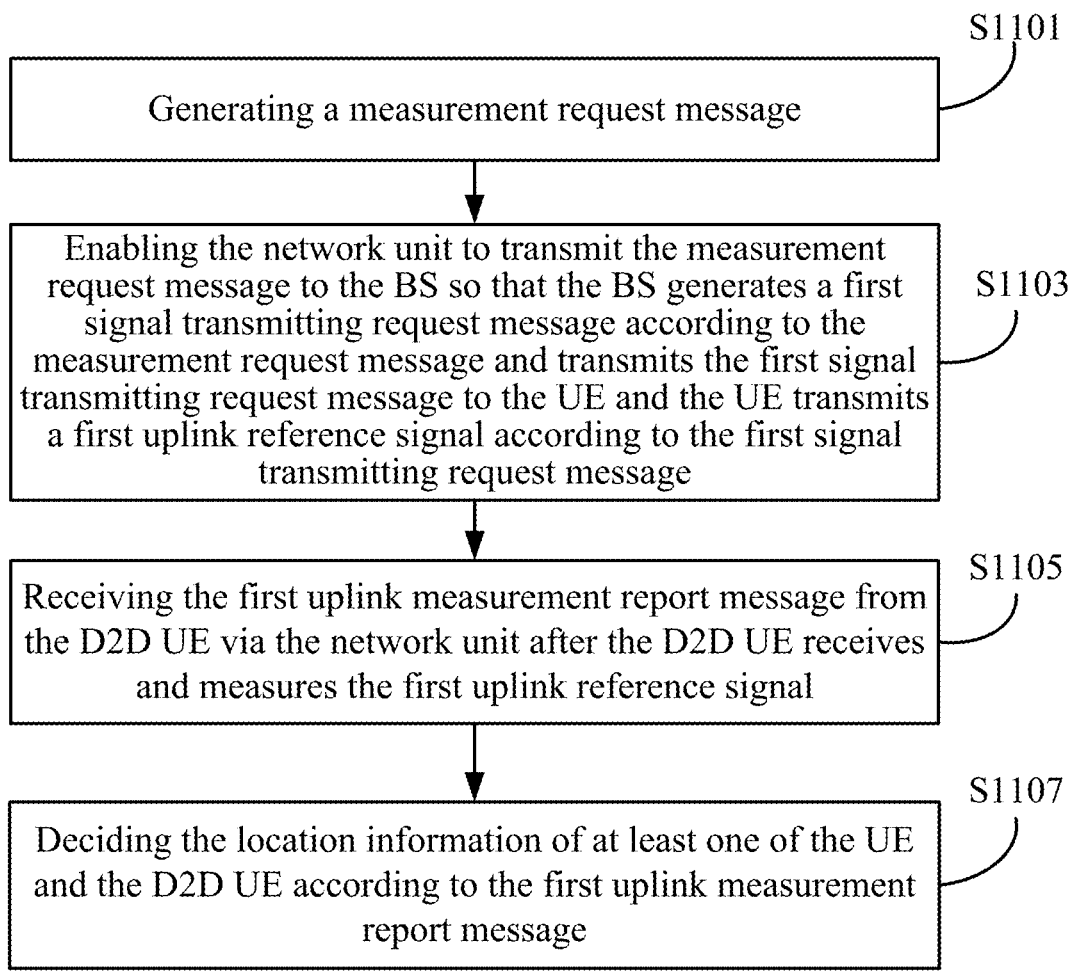
FIG. 11 is a flowchart diagram of a positioning method according to the fifth embodiment of the present invention.

The fifth embodiment of the present invention is a positioning method, and a flowchart diagram of the positioning method is as shown in FIG. 11. The positioning method is adapted for use in a backhaul device (e.g., the backhaul device 4 of the aforesaid embodiments). The backhaul device is used in a mobile communication system, and the mobile communication system comprises the backhaul device, a UE, a D2D UE and a BS and defines an uplink resource and a downlink resource. The uplink resource is used by the UE and the D2D UE for uplink signal transmission, and the downlink resource is used by the BS for downlink signal transmission. The D2D UE is capable of D2D transmission through the uplink resource, and the UE is incapable of the D2D transmission through the uplink resource. The UE is near to the D2D UE. The BS connects to the backhaul device. The backhaul device comprises a network unit and a processing unit. The network unit is configured to connect to the BS. The positioning method is executed by the processing unit.

First, in step S1101, a measurement request message is generated. Next, in step S1103, the network unit is enabled to transmit the measurement request message to the BS so that the BS generates a first signal transmitting request message according to the measurement request message and transmits the first signal transmitting request message to the UE. The first signal transmitting request message indicates a first uplink resource region of the uplink resource. In this way, the UE can transmit a first uplink reference signal according to the first signal transmitting request message and the D2D UE receives and measures the first uplink reference signal to generate a first D2D uplink measurement report message.

Thereafter, in step S1105, the first uplink measurement report message is received from the D2D UE via the network unit after the D2D UE receives and measures the first uplink reference signal. Finally, in step S1107, the location information of at least one of the UE and the D2D UE is determined according to the first uplink measurement report message. In addition to the aforesaid steps, the positioning method of the present invention can also execute all the operations and have all the corresponding functions set forth in all the aforesaid embodiments. How this embodiment executes these operations and have these functions will be readily appreciated by those of ordinary skill in the art based on the explanation of all the aforesaid embodiments, and thus will not be further described herein.

Figure 12:
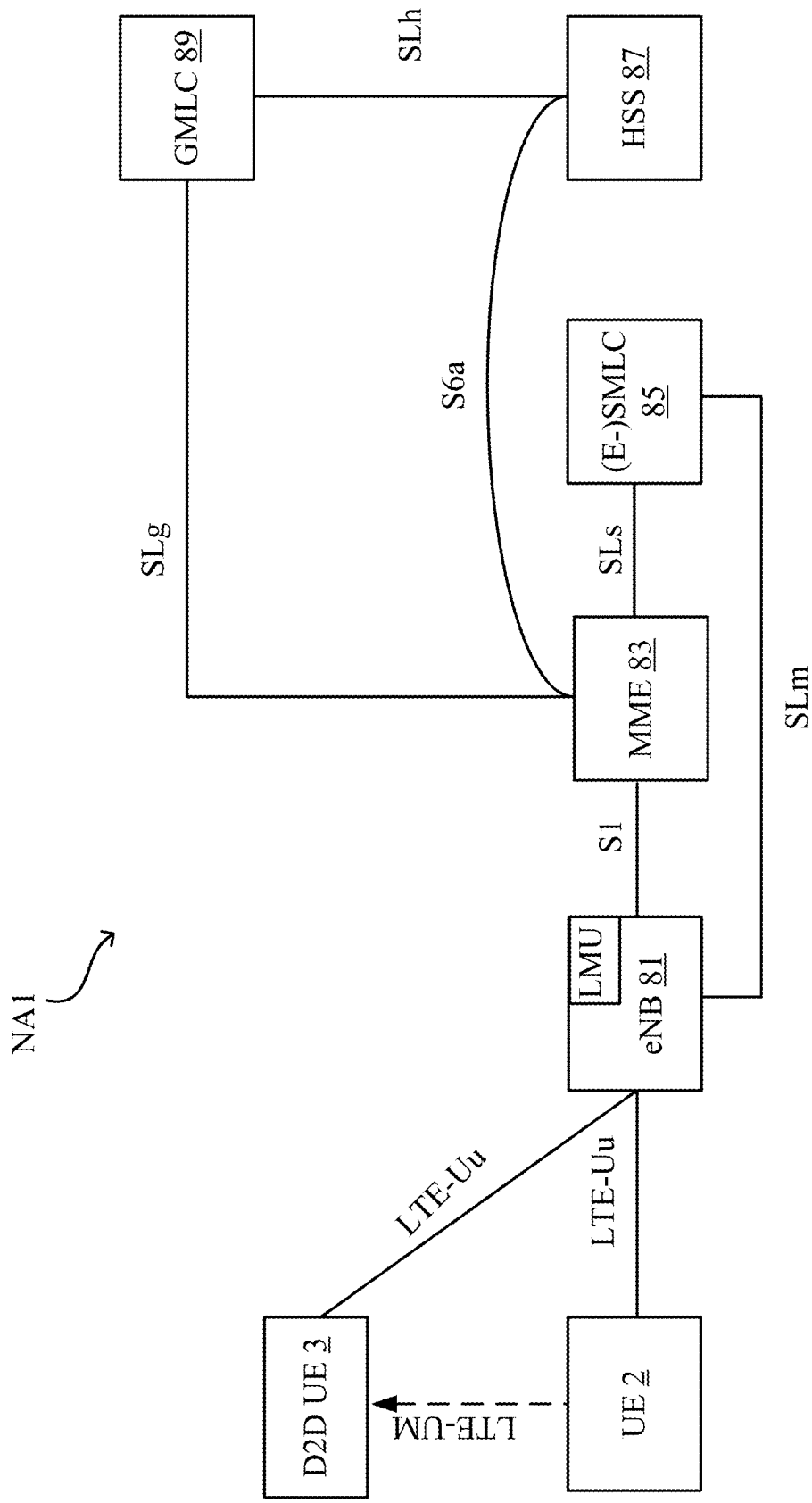
FIG. 12 is a schematic view of a network architecture NA1 according to the sixth embodiment of the present invention.

The sixth embodiment of the present invention is as shown in FIG. 12, which is a schematic view of a network architecture NA1. The network architecture NA1 is adapted for use in the aforesaid first to fifth embodiments. Specifically, the network architecture NA1 comprises the UE 2, the D2D UE 3, an eNB 81, a mobility management entity (MME) 83, an evolved serving mobile location center (E-SMLC) 85, a home subscriber server (HSS) 87, and a gateway mobile location center (GMLC) 89. The eNB 81 has a location measurement unit (LMU) and is configured to generate the downlink reference signal, e.g., the CRS, and the PRS.

Under the network architecture NA1 of this embodiment, the UE 2 and the D2D UE 3 connect to the same eNB 81. The UE 2 and the D2D UE 3 respectively communicate with the eNB 81 via an LTE-Uu interface. The D2D UE 3 receives the uplink reference signal transmitted by the UE 2 via an LTE user monitoring (LTE-UM) interface of the present invention. Further speaking, the LTE-UM interface is an uplink resource region, and the uplink reference signal transmitted by the UE 2 is carried on the uplink resource region. Moreover, the eNB 81 communicates with the MME 83 via an S1 interface. The MME 83 communicates with the E-SMLC 85 via an SLs interface. The MME 83 communicates with the HSS 87 via an S6a interface. The MME 83 communicates with the GMLC 89 via an SLg interface. The GMLC 89 communicates with the HSS 87 via an SLh interface. The eNB 81 communicates with the E-SMLC 85 via an SLm interface.

Figure 13:
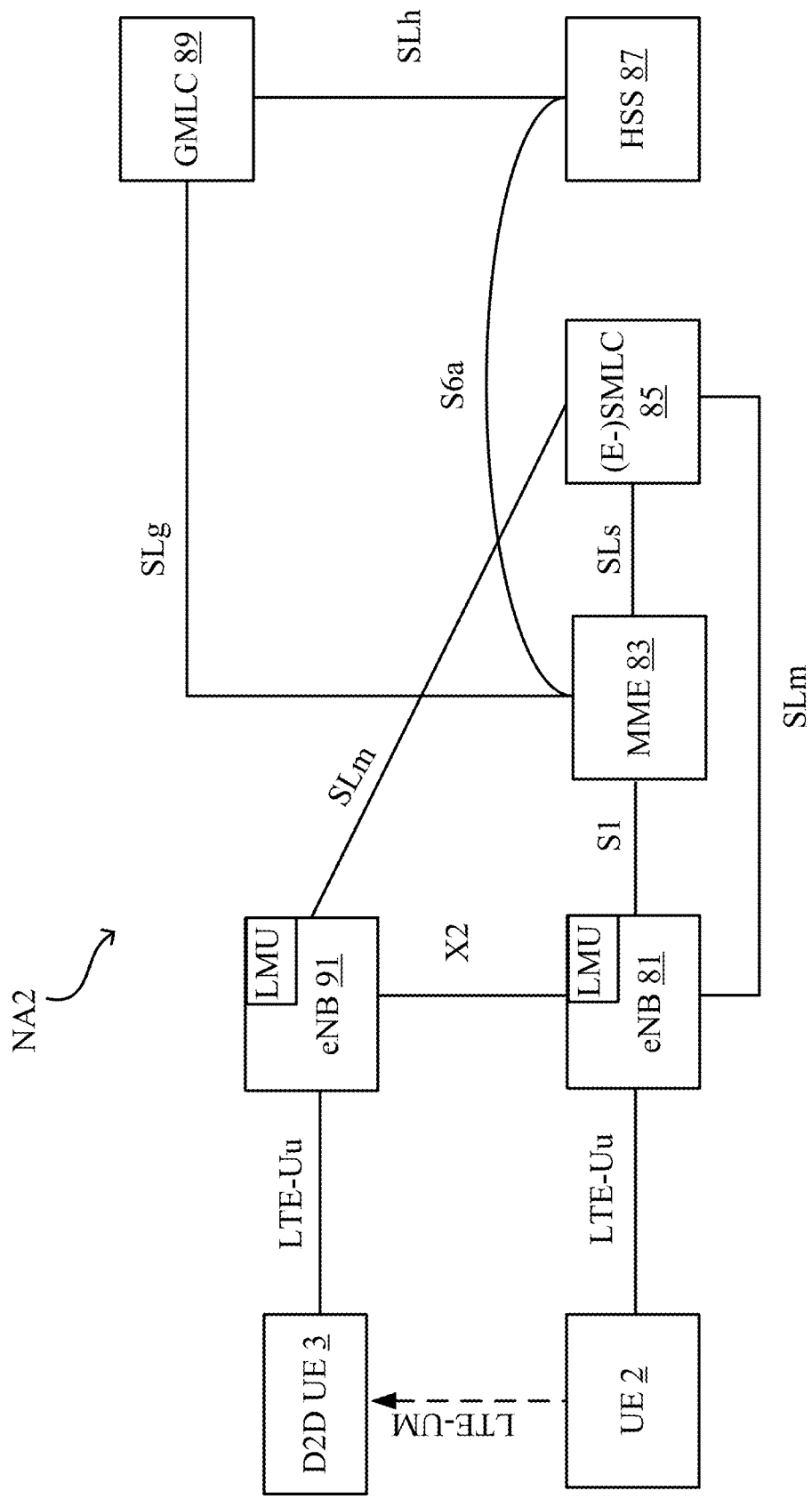
FIG. 13 is a schematic view of a network architecture NA2 according to the seventh embodiment of the present invention.

The seventh embodiment of the present invention is as shown in FIG. 13, which is a schematic view of a network architecture NA2. The network architecture NA2 is adapted for use in the aforesaid first to fifth embodiments. Specifically, the network architecture NA2 comprises the UE 2, the D2D UE 3, the eNB 81, an eNB 91, the MME 83, the E-SMLC 85, the HSS 87 and the GMLC 89.

The difference between this embodiment and the sixth embodiment only lies in that the UE 2 and the D2D UE 3 connect to different base stations, i.e., the UE 2 connects to the eNB 81, and the D2D UE 3 connects to the eNB 91. In this embodiment, the UE 2 communicates with the eNB 81 via the LTE-Uu interface, and the D2D UE 3 communicates with the eNB 91 via the LTE-Uu interface. The eNB 81 communicates with the eNB 91 via X2. The eNB 91 communicates with the E-SMLC 85 via the SLm interface. The remaining connection architecture is the same as that of the sixth embodiment, and thus will not be further described herein.

Figure 14:
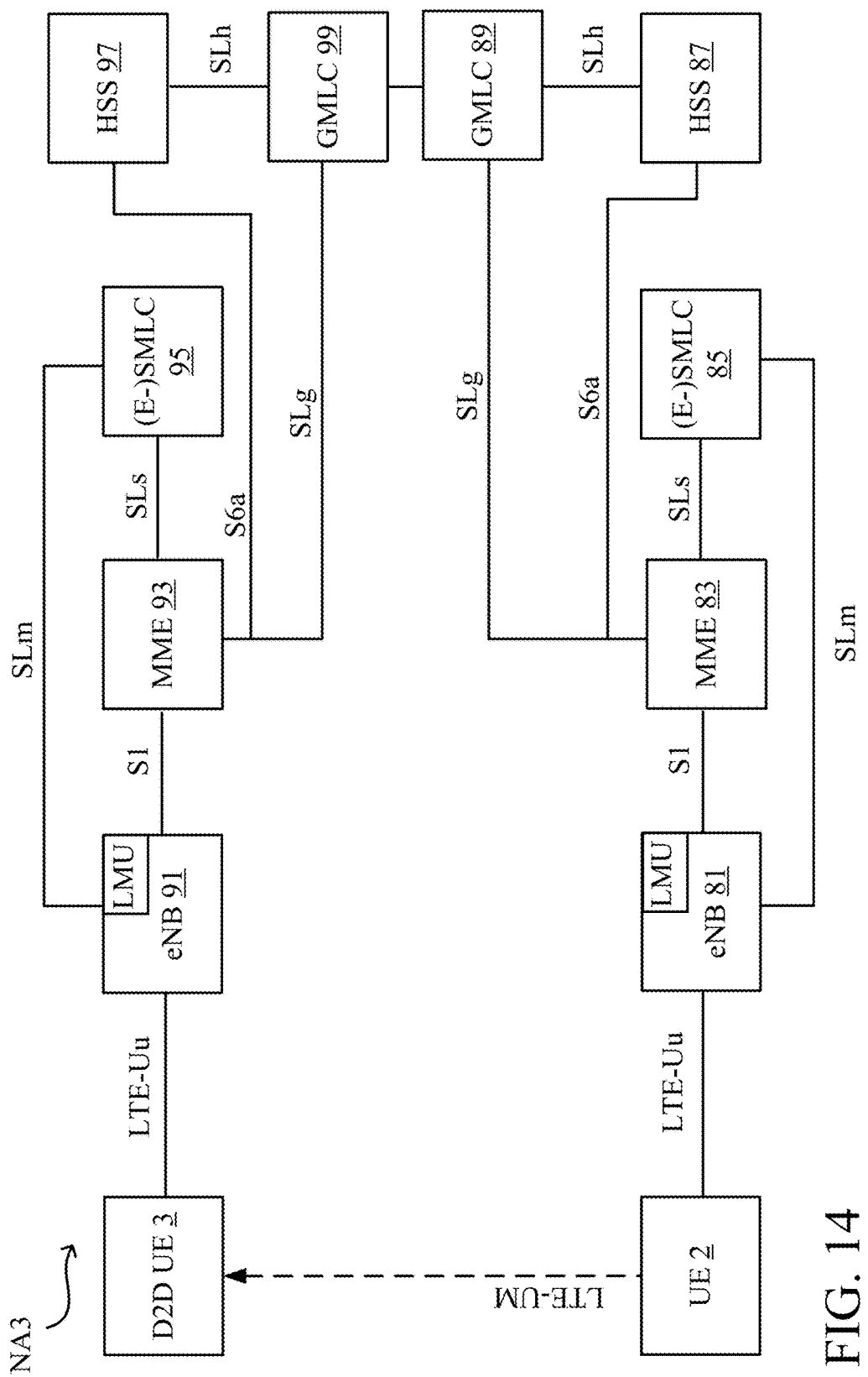
FIG. 14 is a schematic view of a network architecture NA3 according to the eighth embodiment of the present invention.

The eighth embodiment of the present invention is as shown in FIG. 14, which is a schematic view of a network architecture NA3. The network architecture NA3 is adapted for use in the aforesaid first to fifth embodiments. Specifically, this embodiment is a network architecture applied to an inter public land mobile network (inter-PLMN). In other words, the positioning method of the present invention is also adapted for use in the network architecture managed by two operators. The network architecture NA3 comprises the UE 2, the D2D UE 3, the eNB 81, the eNB 91, the MME 83, an MME 93, the E-SMLC 85, an E-SMLC 95, the HSS 87, an HSS 97, the GMLC 89 and a GMLC 99.

In this embodiment, the UE 2 and the D2D UE 3 connect to different base stations, i.e., the UE 2 connects to the eNB 81, and the D2D UE 3 connects to the eNB 91. The UE 2 communicates with the eNB 81 via the LTE-Uu interface, and the D2D UE 3 communicates with the eNB 91 via the LTE-Uu interface. Similarly, the eNB 91 communicates with the MME 93 via the S1 interface, and the eNB 81 communicates with the MME 83 via the S1 interface. The eNB 91 communicates with the E-SMLC 95 via the SLm interface, and the eNB 81 communicates with the E-SMLC 85 via the SLm interface.

The MME 93 communicates with the E-SMLC 95 via the SLs interface, and the MME 83 communicates with the E-SMLC 85 via the SLs interface. The MME 93 may communicate with the HSS 97 via the S6a interface, and the MME 83 may communicate with the HSS 87 via the S6a interface. Moreover, the MME 83 communicates with the GMLC 89 via the SLg interface, and the MME 93 communicates with the GMLC 99 via the SLg interface. The GMLC 89 may communicate with the HSS 87 via the SLh interface, and the GMLC 99 may communicate with the HSS 97 via the SLh interface. The GMLC 89 connects with the GMLC 99.

Figure 15A:
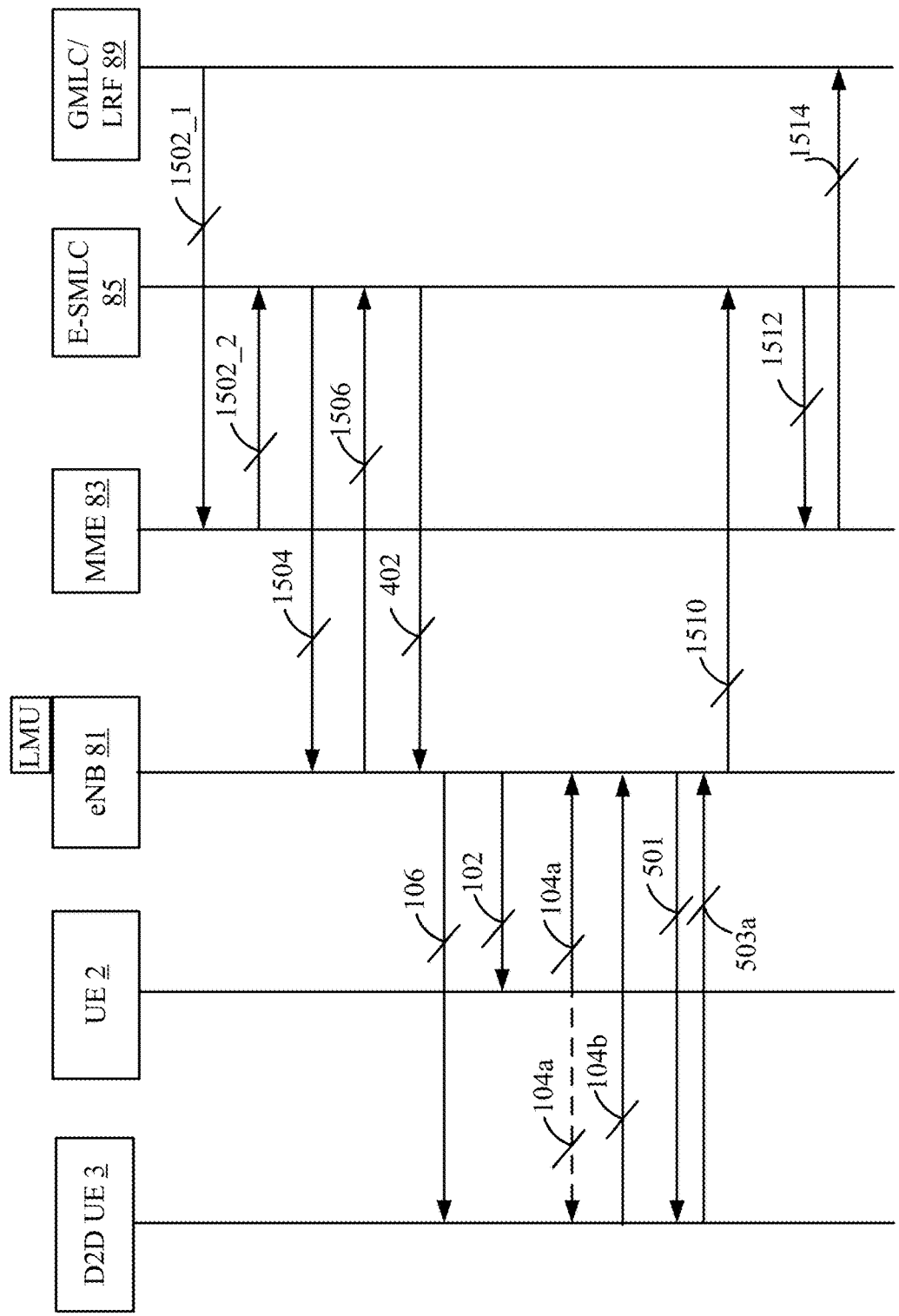
FIG. 15A, FIG. 15B, FIG. 16, FIG. 17, FIG. 18A, FIG. 18B, FIG. 19 and FIG. 20 respectively depict signal transmission in different use scenarios according to the ninth embodiment of the present invention.

The ninth embodiment of the present invention is as shown in FIG. 15A, FIG. 15B, FIG. 16, FIG. 17, FIG. 18A, FIG. 18B, FIG. 19 and FIG. 20, which respectively depict signal transmission in different use scenarios. As shown in FIG. 15A, if the UE 2 wants to acquire a positioning service, or other UEs want to know the location of the UE 2, or the backhaul device wants to know the location of the UE 2, then the GMLC or a location acquisition functional entity 89 is triggered to transmit a location service request message 1502_1 to the MME 83, and the MME 83 then transmits a location service request message 1502_2 to the E-SMLC 85.

Thereafter, the E-SMLC 85 transmits a location information request message 1504 to the eNB 81 according to the received location service request message 1502_2 so that the eNB 81 transmits a location information response message 1506 back to the E-SMLC 85. After receiving the location information response message 1506, the E-SMLC 85 transmits a measurement request message 402 to the eNB 81 so that the eNB 81 transmits the uplink measurement request message 106 to the D2D UE 3 and transmits a signal transmitting request message 102 to the UE 2 according to the measurement request message 402. In detail, the signal transmitting request message 102 may comprise uplink resource region allocation information to inform the UE 2 which uplink resource region should be used to transmit the uplink reference signal. That is, as described earlier, the signal transmitting request message 102 indicates the uplink resource region RG1 of the uplink resource so that the UE 2 transmits the uplink reference signal 104a in the uplink resource region RG1.

Figure 15B:
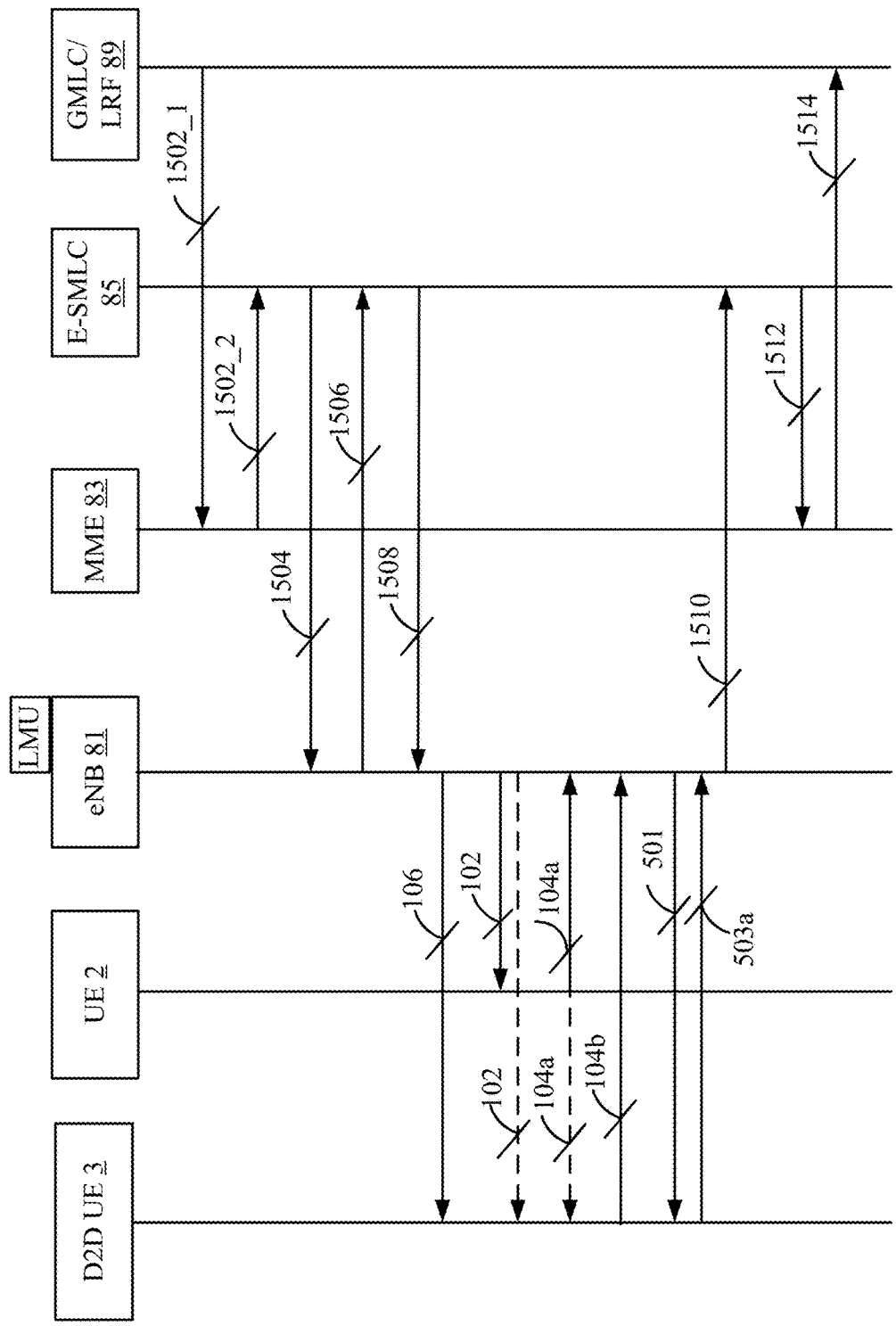

More particularly, the uplink measurement request message 106 may directly indicate the uplink resource region RG1 to inform the D2D UE 3 in which uplink resource region the uplink reference signal 104a transmitted by the UE 2 should be measured. However, in another aspect (as shown in FIG. 15B), the uplink measurement request message 106 only carries the identity of the UE 2 and does not explicitly indicate the uplink resource region RG1. In the case that the eNB 81 transmits the signal transmitting request message 102 via broadcast, the D2D UE 3 may also indirectly learn the uplink resource region RG1 from the uplink resource region allocation information carried in the signal transmitting request message 102 according to the identity of the UE 2.

After receiving the signal transmitting request message 102, the UE 2 can learn that the uplink reference signal 104a needs to be transmitted in the uplink resource region RG1. Therefore, the UE 2 transmits the uplink reference signal 104a in the uplink resource region RG1. Thereafter, the D2D UE 3 receives and measures the uplink reference signal 104a in the uplink resource region RG1. On the other hand, the eNB 81 also receives and measures the uplink reference signal 104a in the uplink resource region RG1 to generate a BS uplink measurement report message 104c. Thereafter, the D2D UE 3 transmits a D2D uplink measurement report message 104b to the eNB 81 according to the measurement result.

Next, the eNB 81 may transmit a signal transmitting request message 501 to the D2D UE 3. The signal transmitting request message 501 indicates an uplink resource region RG2, so the D2D UE 3 transmits an uplink reference signal 503a to the eNB 81 in the uplink resource region RG2. Accordingly, the eNB 81 can measure the uplink reference signal 503a to generate a BS uplink measurement report message 503b. In this way, the eNB 81 can transmit a measurement response message 1510 to the E-SMLC 85 according to all the received measurement results (including the D2D uplink measurement report message 104b, the BS uplink measurement report message 503b and the BS uplink measurement report message 104c).

It shall be appreciated that, in FIG. 15A to FIG. 15B, only a single measurement response message 1510 is indicated to represent that the eNB 81 collects all the measurement results and then reports them to the E-SMLC 85. However, as can be appreciated by those of ordinary skill in the art, relevant measurement information can be transmitted by the eNB 81 to the E-SMLC 85 once being collected without having to wait for a period of time to collect all the measurement results and then transmit all the collected measurement results to the E-SMLC 85. Then, the E-SMLC 85 decides the location of the UE 2 according to the measurement response message 1510 and transmits a location service response message 1512 to the MME 83. Finally, the MME 83 transmits a location service response message 1514 to the GMLC or the location acquisition functional entity 89.

Figure 16:
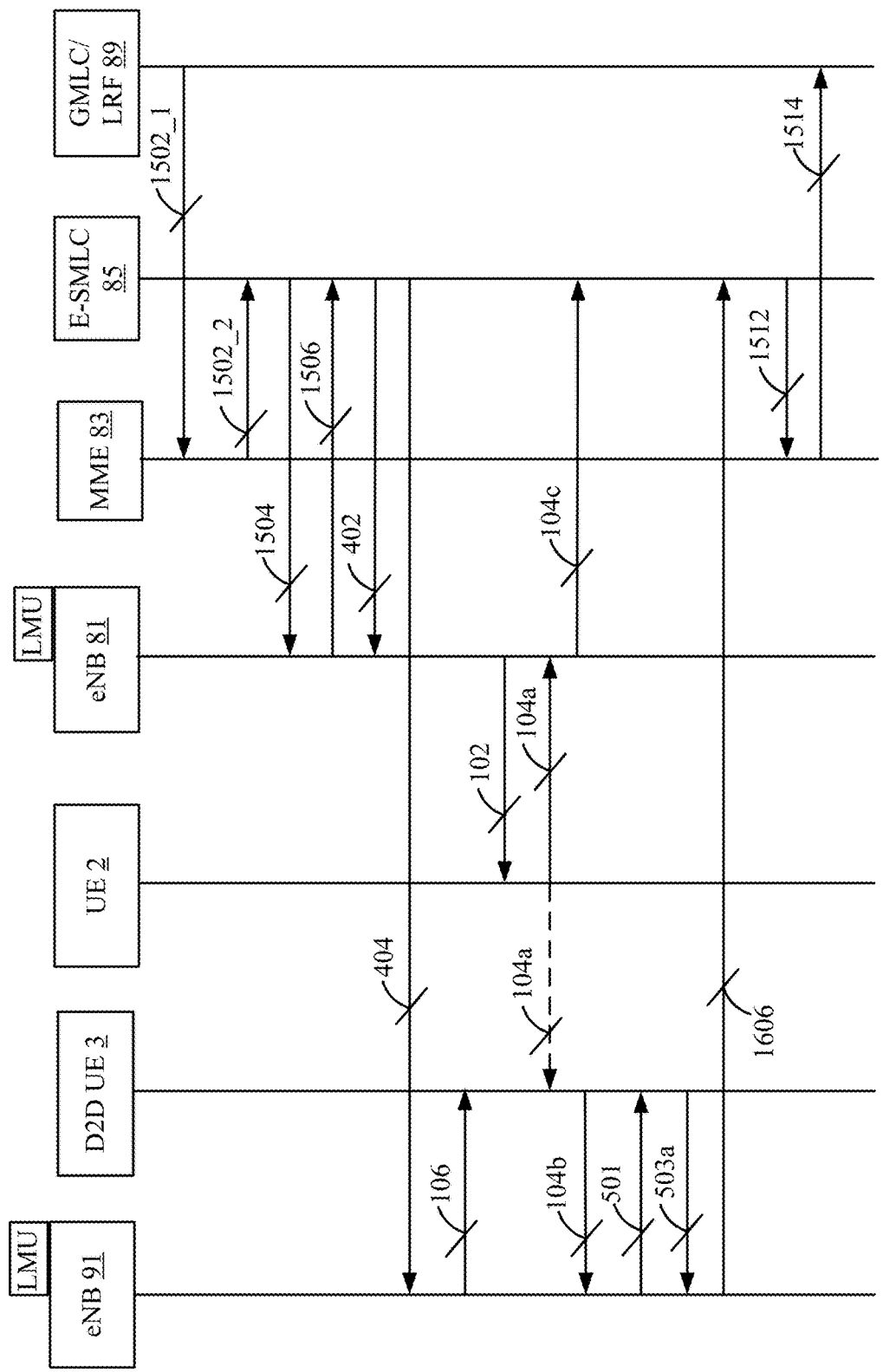

The scenario illustrated in FIG. 15A to FIG. 15B is that the UE 2 and the D2D UE 3 connect to the same eNB 81. However, in other scenarios, the UE 2 and the D2D UE 3 may connect to different base stations. For example, as shown in FIG. 16, first, if the UE 2 wants to acquire a positioning service, or other UEs want to know the location of the UE 2, or the backhaul device wants to know the location of the UE 2, then the GMLC or the location acquisition functional entity 89 is triggered to transmit a location service request message 1502_1 to the MME 83, and the MME 83 then transmits a location service request message 1502_2 to the E-SMLC 85.

Thereafter, the E-SMLC 85 transmits a location information request message 1504 to the eNB 81 according to the received location service request message 1502_2 so that the eNB 81 transmits a location information response message 1506 back to the E-SMLC 85. After receiving the location information response message 1506, the E-SMLC 85 transmits a measurement request message 402 to the eNB 81 and transmits a measurement request message 404 to the eNB 91 so that the eNB 91 transmits an uplink measurement request message 106 to the D2D UE 3 according to the measurement request message 404 and the eNB 81 transmits the signal transmitting request message 102 to the UE 2 according to the measurement request message 402. As described earlier, the signal transmitting request message 102 may comprise an uplink resource region allocation information to inform the UE 2 that the uplink reference signal 104a should be transmitted in the uplink resource region RG1. The uplink measurement request message 106 may indicate the uplink resource region RG1 to inform the D2D UE 3 that the uplink reference signal 104a transmitted by the UE 2 should be measured in the uplink resource region RG1.

Next, the UE 2 transmits the uplink reference signal 104a according to the signal transmitting request message 102. Thereafter, the D2D UE 3 receives and measures the uplink reference signal 104a in the uplink resource region RG1 to generate the D2D uplink measurement report message 104b. On the other hand, the eNB 81 may also receive and measure the uplink reference signal 104a in the uplink resource region RG1 to generate the BS uplink measurement report message 104c. Thereafter, the eNB 91 may transmit a signal transmitting request message 501 to the D2D UE 3, and the signal transmitting request message 501 indicates the uplink resource region RG2, so the D2D UE 3 can transmit the uplink reference signal 503a in the uplink resource region RG2. Accordingly, the eNB 91 can measure the uplink reference signal 503a to generate the BS uplink measurement report message 503b.

Thereafter, the eNB 91 can transmit a measurement response message 1606 to the E-SMLC 85 according to all the received measurement results (including the D2D uplink measurement report message 104b and the BS uplink measurement report message 503b). Similarly, it shall be appreciated that, only a single measurement response message 1606 is indicated to represent that the eNB 91 collects all the measurement results and then reports them to the E-SMLC 85 in FIG. 16. However, as can be appreciated by those of ordinary skill in the art, relevant measurement information can be transmitted by the eNB 91 to the E-SMLC 85 once being collected without having to wait for a period of time to collect all the measurement results and then transmit all the collected measurement results to the E-SMLC 85.

For example, after receiving the D2D uplink measurement report message 104b, the eNB 91 can directly transmit the D2D uplink measurement report message 104b to the E-SMLC 85; and after generating the BS uplink measurement report message 503b, the eNB 91 can directly transmit the BS uplink measurement report message 503b to the E-SMLC. Thereafter, the E-SMLC 85 transmits a location service response message 1512 to the MME 83 according to the collected relevant measurement results (the D2D uplink measurement report message 104b and the BS uplink measurement report message 503b). Finally, the MME 83 transmits a location service response message 1514 to the GMLC or the location acquisition functional entity 89.

Figure 17:
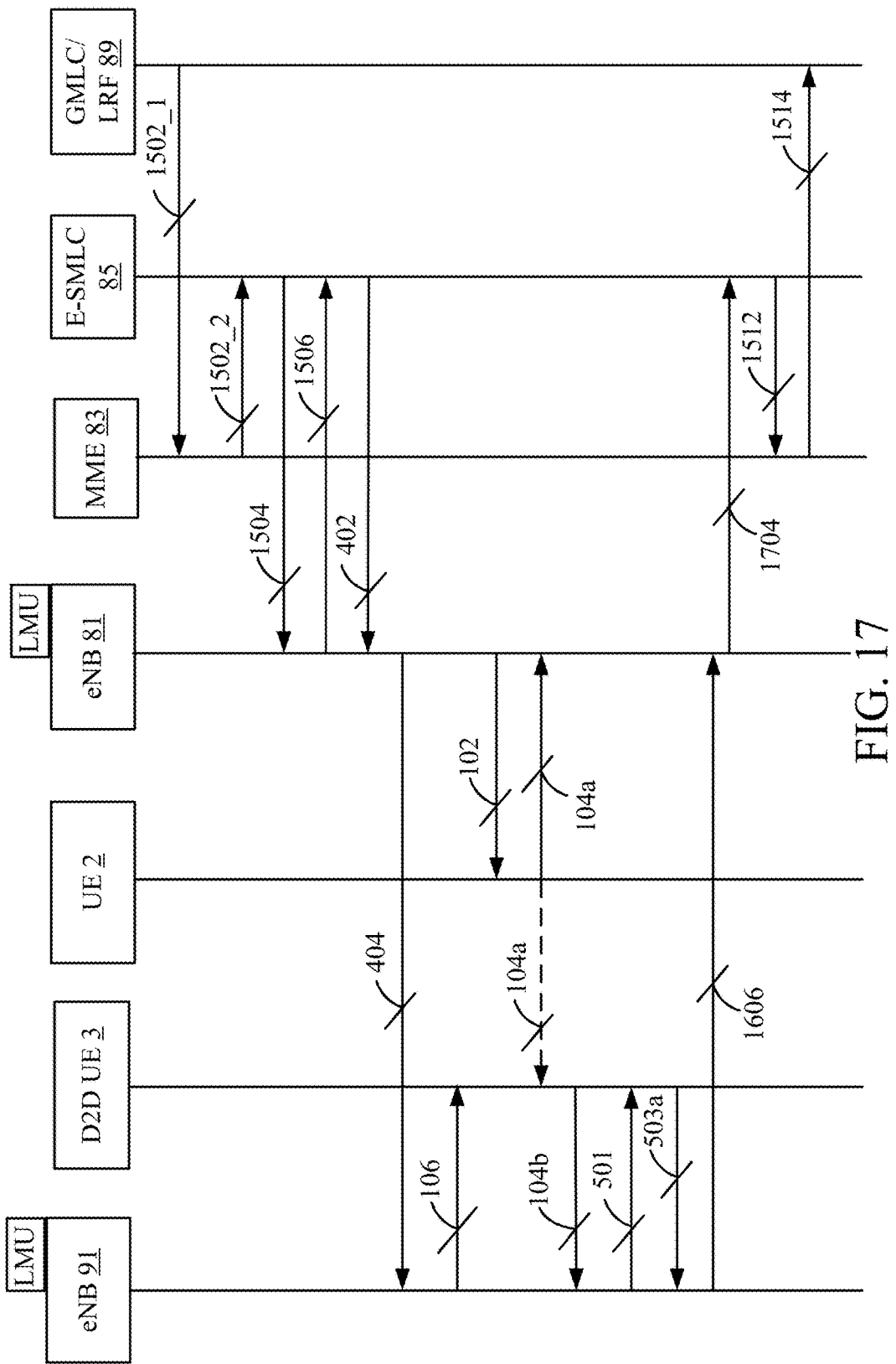

In another aspect, the eNB 81 may communicate with the eNB 91 via the X2 interface as shown in FIG. 17, and only the difference between FIG. 17 and FIG. 16 will be described herein. After transmitting a location information response message 1506 to the E-SMLC 85, the eNB 81 receives the measurement request message 402 from the E-SMLC 85. After receiving the measurement request message 402, the eNB 81 transmits the measurement request message 404 to the eNB 91 via the X2 interface. On the other hand, the eNB 91 transmits the measurement response message 1606 to the eNB 81 according to all the received measurement results (including the D2D uplink measurement report message 104b and the BS uplink measurement report message 503b) via the X2 interface.

Thereafter, the eNB 81 can generate a measurement response message 1704 according to all the measurement results (including the received measurement response message 1606 and the BS uplink measurement report message 104c), and transmit the measurement response message 1704 to the E-SMLC 85 so that the E-SMLC 85 decides the location of the UE 2 according to the measurement response message 1704 and transmits a location service response message 1512 to the MME 83.

In the aforesaid aspects, the signal transmission for positioning the UE 2 is described. Next, FIG. 18A to FIG. 18B and FIG. 19 to FIG. 20 respectively depict the signal transmission for positioning the D2D UE 3. First, in FIG. 18A to FIG. 18B, if the D2D UE 3 wants to acquire a positioning service, or other UEs want to know the location of the D2D UE 3, or the backhaul device wants to know the location of the D2D UE 3, then the GMLC or the location acquisition functional entity 89 is triggered to transmit a location service request message 1802_1 to the MME 83, and the MME 83 then transmits a location service request message 1802_2 to the E-SMLC 85.

Thereafter, the E-SMLC 85 transmits a location information request message 1804 to the eNB 81 according to the received location service request message 1802_2 so that the eNB 81 transmits a location information response message 1806 back to the E-SMLC 85. After receiving the location information response message 1806, the E-SMLC 85 transmits a measurement request message 402 to the eNB 81 so that the eNB 81 transmits the uplink measurement request message 106 to the D2D UE 3 and transmits the signal transmitting request message 102 to the UE 2 according to the measurement request message 402.

Thereafter, the UE 2 transmits the uplink reference signal 104a in the uplink resource region RG1. The eNB 81 receives and measures the uplink reference signal 104a in the uplink resource region RG1 to generate the BS uplink measurement report message 104c. Thereafter, the D2D UE 3 transmits the D2D uplink measurement report message 104b to the eNB 81 according to the measurement result. The eNB 81 may transmit the signal transmitting request message 501 to the D2D UE 3 so that the D2D UE 3 transmits an uplink reference signal 503a in the uplink resource region RG2. The eNB 81 may measure the uplink reference signal 503a to generate the BS uplink measurement report message 503b. In this way, the eNB 81 can transmit a measurement response message 1810 to the E-SMLC 85 according to all the received measurement results (including the D2D uplink measurement report message 104b, the BS uplink measurement report message 104b and the BS uplink measurement report message 503b).

It shall be appreciated that, in FIG. 16A to FIG. 16B, only a single measurement response message 1810 is indicated to represent that the eNB 81 collects all the measurement results and then reports them to the E-SMLC 85. However, as can be appreciated by those of ordinary skill in the art, relevant measurement information can be transmitted by the eNB 81 to the E-SMLC 85 once being collected without having to wait for a period of time to collect all the measurement results and then transmit all the collected measurement results to the E-SMLC 85. Thereafter, the E-SMLC 85 decides the location of the D2D UE 3 according to the measurement response message 1810, and transmits a location service response message 1812 to the MME 83. Finally, the MME 83 transmits a location service response message 1814 to the GMLC or the location acquisition functional entity 89.

Figure 18A:
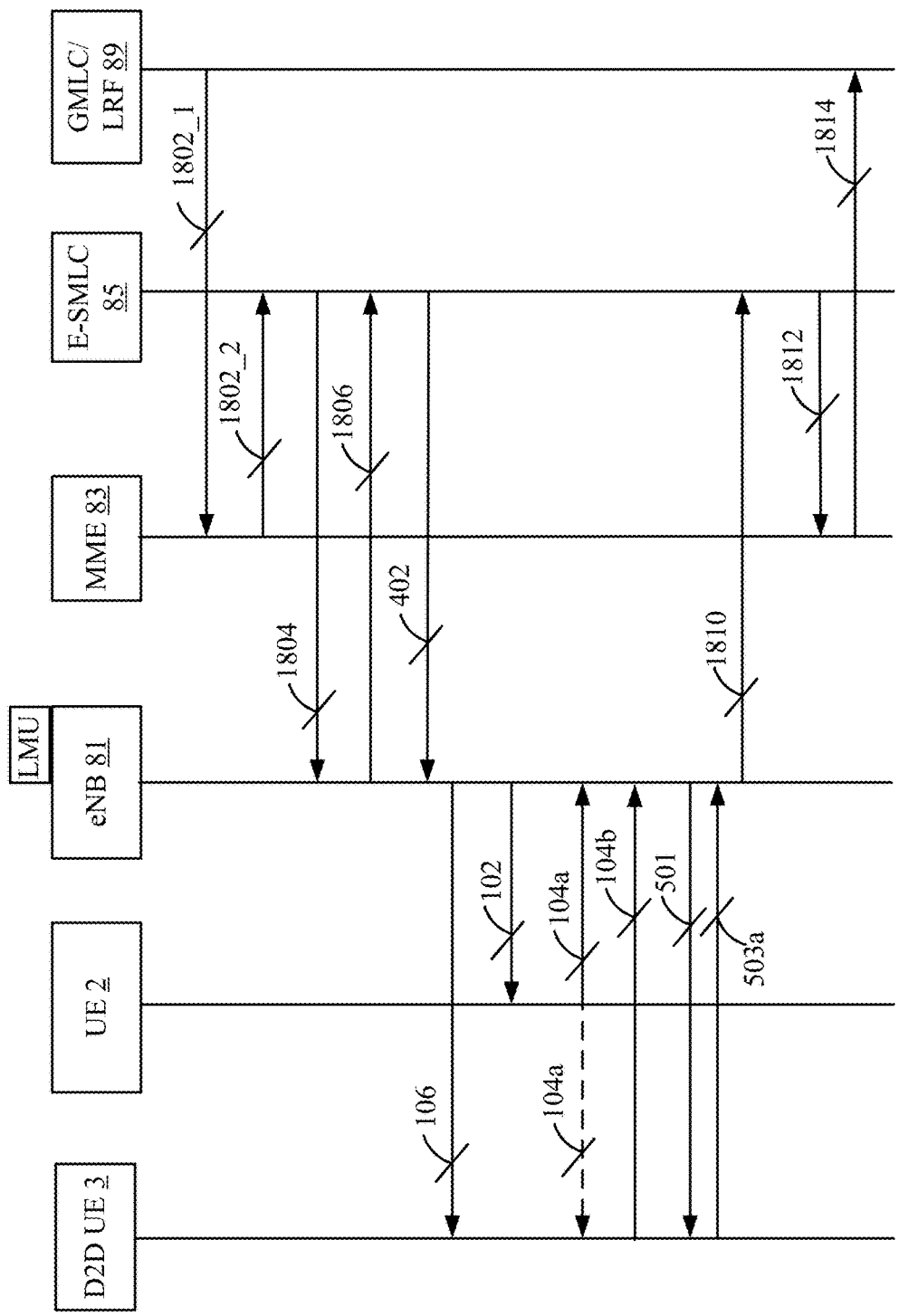
Figure 18B:
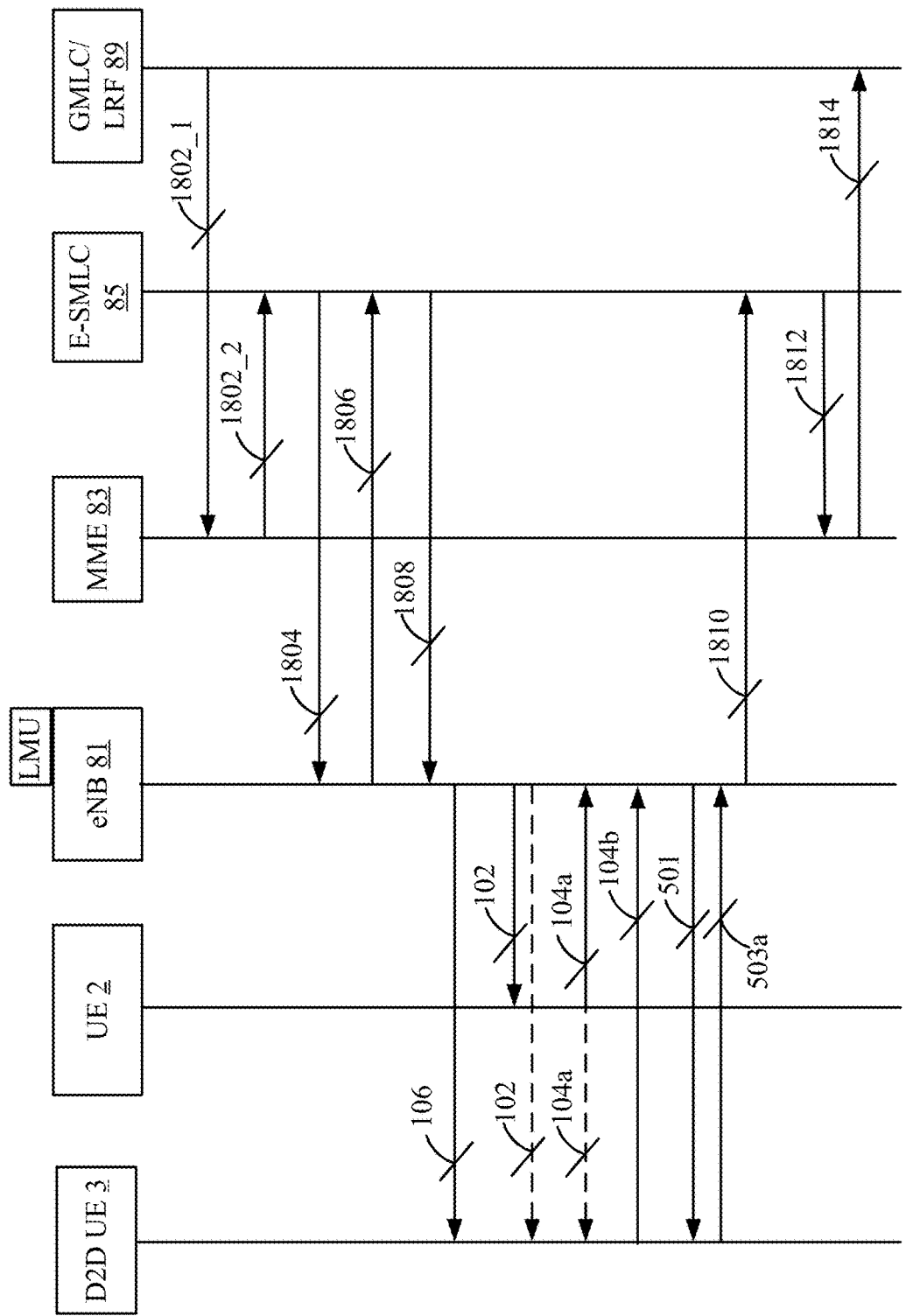
Figure 19:
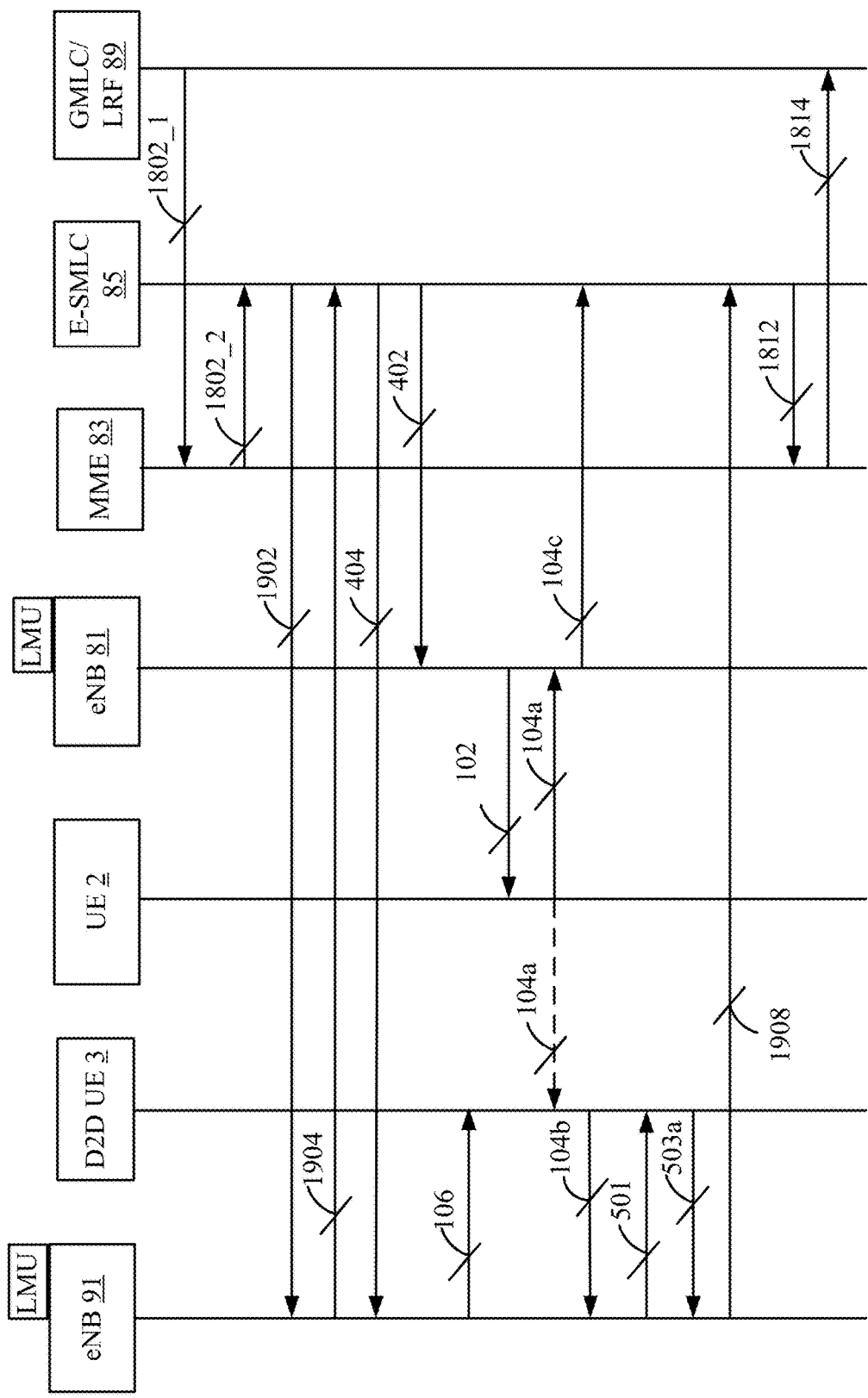

The scenario illustrated in FIG. 18A to FIG. 18B is that the UE 2 and the D2D UE 3 connect to the same eNB 81. However, in other scenarios, the UE 2 and the D2D UE 3 may connect to different base stations. Herein, only the major difference from FIG. 18A and FIG. 18B is described. For example, as shown in FIG. 19, the E-SMLC 85 transmits a location information request message 1902 to the eNB 91 according to the received location service request message 1802_2 so that the eNB 91 transmits a location information response message 1904 back to the E-SMLC 85. After receiving the location information response message 1904, the E-SMLC 85 transmits the measurement request message 404 to the eNB 91 and transmits the measurement request message 402 to the eNB 81. Next, the eNB 91 transmits the uplink measurement request message 106 to the D2D UE 3 according to the measurement request message 404, and the eNB 81 transmits the signal transmitting request message 102 to the UE 2 according to the measurement request message 402.

On the other hand, after measuring the uplink reference signal 104a, the eNB 81 transmits the BS uplink measurement report message 104c to the E-SMLC 85, and the eNB 91 may transmit a measurement response message 1908 to the E-SMLC 85 according to the collected measurement results (including the D2D uplink measurement report message 104b and the BS uplink measurement report message 503b). Thereafter, the E-SMLC 85 transmits the location service response message 1812 to the MME 83 according to the collected relevant measurement results (the BS uplink measurement report message 104c and the measurement response message 1908). Finally, the MME 83 transmits the location service response message 1814 to the GMLC or the location acquisition functional entity 89.

Figure 20:
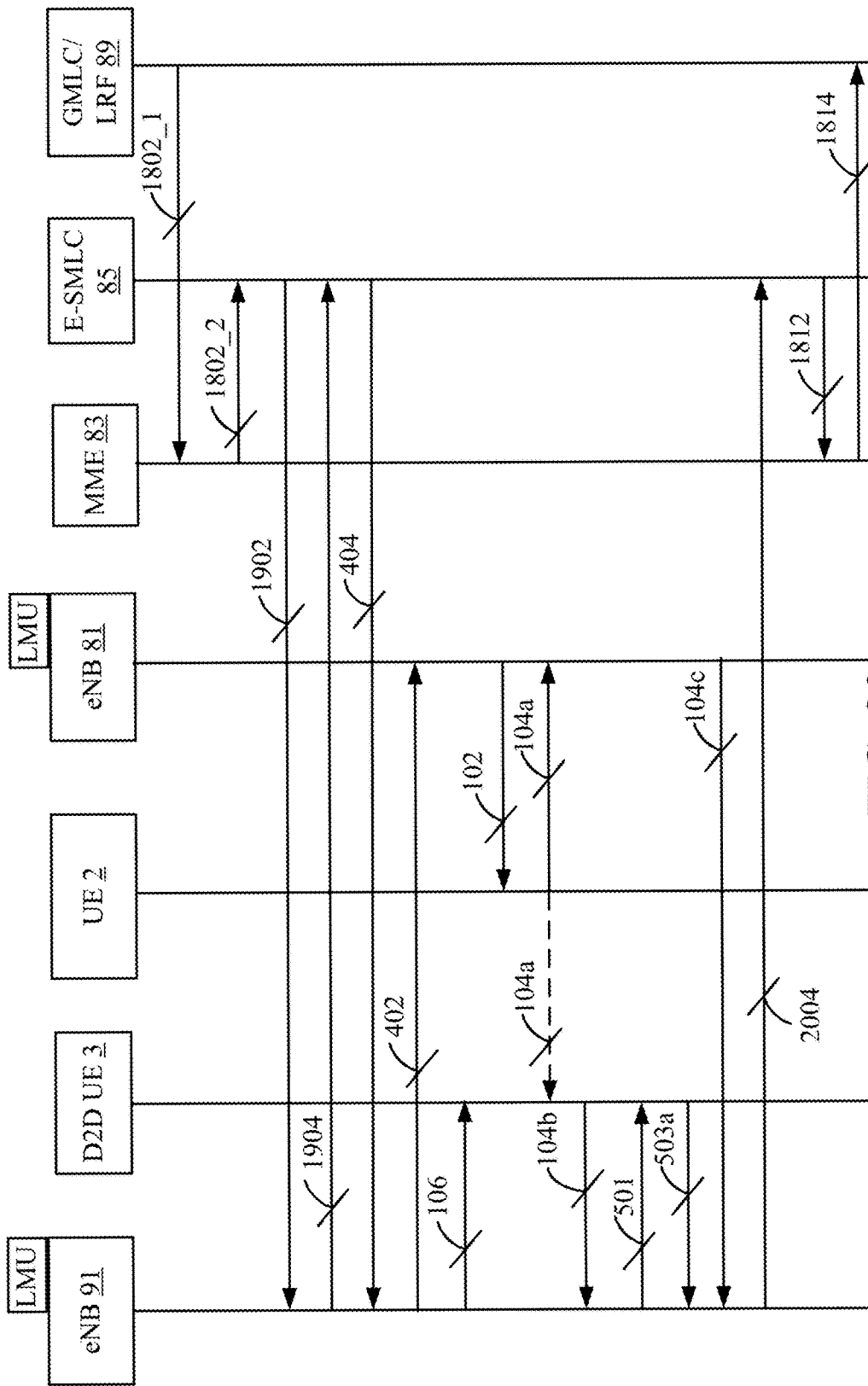

In another aspect, the eNB 81 may communicate with the eNB 91 via the X2 interface as shown in FIG. 20, and only the difference between FIG. 20 and FIG. 19 will be described herein. First, after receiving the measurement request message 404, the eNB 91 transmits the measurement request message 402 to the eNB 81 via the X2 interface. Moreover, after measuring the uplink reference signal 104a, the eNB 81 may transmit the BS uplink measurement report message 104c to the eNB 91 via the X2 interface. In this way, the eNB 91 can transmit a measurement response message 2004 to the E-SMLC 85 according to all the measurement results (the BS uplink measurement report message 104c, the D2D uplink measurement report message 104b and the BS uplink measurement report message 503b).

According to the above descriptions, with the positioning mechanism of the present invention, the uplink reference signal transmitted by the conventional UE not having the D2D transmission function can be measured through the D2D UE for positioning. Moreover, for the UE/D2D UE to be positioned, the positioning mechanism of the present invention may further measure the downlink reference signal and/or the uplink reference signal via UEs/D2D UEs surrounding the UE/D2D UE to be positioned so that the backhaul device can accordingly calculate the location information. Accordingly, the present invention allows the user to position the UE via the mobile communication network even in cases where the number of surrounding base stations is insufficient.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, the mobile communication system comprising the UE, a device to device (D2D) UE, a base station (BS) and a backhaul device and defining an uplink resource and a downlink resource, the uplink resource being used by the UE and the D2D UE for an uplink signal transmission, the downlink resource being used by the BS for a downlink signal transmission, the D2D UE being capable of D2D transmission through the uplink resource, the UE being incapable of the D2D transmission through the uplink resource, the D2D UE being near to the UE, and the BS connecting to the backhaul device, the UE comprising:
   a transceiver connecting to the BS, being configured to receive a signal transmitting request message from the BS, the signal transmitting request message indicating an uplink resource region of the uplink resource; and
   a processor electrically connected to the transceiver, being configured to generate an uplink reference signal according to the signal transmitting request message and enable the transceiver to transmit the uplink reference signal in the uplink resource region;
   wherein the D2D UE receives the uplink reference signal from the uplink resource region, measures the uplink reference signal to generate a D2D uplink measurement report message, and transmits the D2D uplink measurement report message to the backhaul device so that the backhaul device decides location information of at least one of the UE and the D2D UE according to the D2D uplink measurement report message.

2. The UE of claim 1, wherein the BS further receives the uplink reference signal from the uplink resource region, measures the uplink reference signal to generate a BS uplink measurement report message, and transmits the BS uplink measurement report message to the backhaul device so that the backhaul device further decides the location information of at least one of the UE and the D2D UE according to the D2D uplink measurement report message and the BS uplink measurement report message;
   wherein when the mobile communication system further comprises another BS near to the UE, the another BS further receives the uplink reference signal from the uplink resource region, measures the uplink reference signal to generate another BS uplink measurement report message and transmits the another BS uplink measurement report message to the backhaul device so that the backhaul device further decides the location information of at least one of the UE and the D2D UE according to the D2D uplink measurement report message, the BS uplink measurement report message and the another BS uplink measurement report message.

3. The UE of claim 1, wherein the BS further transmits a downlink reference signal, the transceiver further receives the downlink reference signal from the BS, and the processor measures the downlink reference signal to generate a downlink measurement report message and enables the transceiver to transmit the downlink measurement report message to the backhaul device so that the backhaul device further decides the location information of at least one of the UE and the D2D UE according to the D2D uplink measurement report message and the downlink measurement report message;
   wherein when the D2D UE is near to the BS, the D2D UE further receives the downlink reference signal from the BS and generates a D2D downlink measurement report message, and transmits the D2D downlink measurement report message to the backhaul device so that the backhaul device further decides the location information of at least one of the UE and the D2D UE according to the D2D uplink measurement report message, the downlink measurement report message and the D2D downlink measurement report message.

4. The UE of claim 3, wherein when the mobile communication system further comprises another BS near to the UE, the another BS further transmits another downlink reference signal, the transceiver further receives the another downlink reference signal from the another BS, and the processor measures the another downlink reference signal to generate another downlink measurement report message and enables the transceiver to transmit the another downlink measurement report message to the backhaul device so that the backhaul device further decides the location information of at least one of the UE and the D2D UE according to the D2D uplink measurement report message, the downlink measurement report message and the another downlink measurement report message;
   wherein when the mobile communication system further comprises the another BS near to the UE and the D2D UE is near to the BS, the backhaul device further decides the location information of at least one of the UE and the D2D UE according to the D2D uplink measurement report message, the downlink measurement report message, the another downlink measurement report message and the D2D downlink measurement report message;
   wherein when the mobile communication system further comprises the another BS near to the UE and the D2D UE, the D2D UE further receives the another downlink reference signal from the another BS, generates another D2D downlink measurement report message, and transmits the another D2D downlink measurement report message to the backhaul device so that the backhaul device further decides the location information of at least one of the UE and the D2D UE according to the D2D uplink measurement report message, the downlink measurement report message, the another downlink measurement report message and the another D2D downlink measurement report message; and
   wherein when the mobile communication system further comprises the another BS near to the UE and the D2D UE and the D2D UE is near to the BS, the backhaul device further decides the location information of at least one of the UE and the D2D UE according to the D2D uplink measurement report message, the downlink measurement report message, the another downlink measurement report message, the D2D downlink measurement report message and the another D2D downlink measurement report message.

5. A device to device (D2D) UE for a mobile communication system, the mobile communication system comprising the D2D UE, a UE, a BS and a backhaul device and defining an uplink resource and a downlink resource, the uplink resource being used by the UE and the D2D UE for an uplink signal transmission, the downlink resource being used by the BS for a downlink signal transmission, the D2D UE being capable of D2D transmission through the uplink resource, the UE being incapable of the D2D transmission through the uplink resource, the D2D UE being near to the UE, and the BS connecting to the backhaul device, the D2D UE comprising:
- a transceiver connecting to the BS, being configured to receive a first uplink reference signal from the UE via a first uplink resource region of the uplink resource, wherein the UE receives a signal transmitting request message and transmits the first uplink reference signal in the first uplink resource region according to the first uplink resource region indicated by the signal transmitting request message; and
- a processor electrically connected to the transceiver, being configured to generate a D2D uplink measurement report message according to the first uplink reference signal and enables the transceiver to transmit the D2D uplink measurement report message to the backhaul device so that the backhaul device decides location information of at least one of the UE and the D2D UE according to the D2D uplink measurement report message.

6. The D2D UE of claim 5, wherein the transceiver further receives an uplink measurement request message from the BS to learn the first uplink resource region from the uplink measurement request message, and the processor enables the transceiver to receive the first uplink reference signal from the first uplink resource region.

7. The D2D UE of claim 5, wherein the transceiver further receives another signal transmitting request message from the BS, the another signal transmitting request message indicates a second uplink resource region of the uplink resource, and the processor generates a second uplink reference signal according to the another signal transmitting request message and enables the transceiver to transmit the second uplink reference signal in the second uplink resource region so that the BS receives the second uplink reference signal from the second uplink resource region, measures the second uplink reference signal to generate a BS uplink measurement report message, and transmits the BS uplink measurement report message to the backhaul device so that the backhaul device further decides the location information of at least one of the UE and the D2D UE according to the D2D uplink measurement report message and the BS uplink measurement report message;
wherein when the mobile communication system further comprises another BS near to the D2D UE, the another BS receives the second uplink reference signal from the second uplink resource region, measures the second uplink reference signal to generate another BS uplink measurement report message and transmits the another BS uplink measurement report message to the backhaul device so that the backhaul device further decides the location information of at least one of the UE and the D2D UE according to the D2D uplink measurement report message, the BS uplink measurement report message and the another BS uplink measurement report message.

8. The D2D UE of claim 5, wherein the BS further transmits a downlink reference signal, the transceiver further receives the downlink reference signal from the BS, and the processor measures the downlink reference signal to generate a D2D downlink measurement report message and enables the transceiver to transmit the D2D downlink measurement report message to the backhaul device so that the backhaul devices decides the location information of at least one of the UE and the D2D UE according to the D2D uplink measurement report message and the D2D downlink measurement report message;
wherein when the UE is near to the BS, the UE further receives the downlink reference signal from the BS, measures the downlink reference signal to generate a downlink measurement report message and transmits the downlink measurement report message to the backhaul device so that the backhaul device decides the location information of at least one of the UE and the D2D UE according to the D2D uplink measurement report message, the D2D downlink measurement report message and the downlink measurement report message.

9. The D2D UE of claim 8, wherein when the mobile communication system further comprises another BS near to the D2D UE, the another BS further transmits another downlink reference signal, the transceiver further receives the another downlink reference signal from the another BS, and the processor measures the another downlink reference signal to generate another D2D downlink measurement report message and enables the transceiver to transmit the another D2D downlink measurement report message to the backhaul device so that the backhaul device further decides the location information of at least one of the UE and the D2D UE according to the D2D uplink measurement report message, the D2D downlink measurement report message and the another D2D downlink measurement report message;
wherein when the UE is near to the BS and the mobile communication system further comprises the another BS near to the D2D UE, the backhaul device further decides the location information of at least one of the UE and the D2D UE according to the D2D uplink measurement report message, the D2D downlink measurement report message, the another D2D downlink measurement report message and the downlink measurement report message;
wherein when the mobile communication system further comprises the another BS near to the D2D UE and the UE, the UE further receives the second downlink reference signal from the another BS, measures the second downlink reference signal to generate another downlink measurement report message, and transmits the another downlink measurement report message to the backhaul device; and
wherein when the UE is near to the BS and the mobile communication system further comprises the another BS near to the D2D UE and the UE, the backhaul device further decides the location information of at least one of the UE and the D2D UE according to the D2D uplink measurement report message, the D2D downlink measurement report message, the another D2D downlink measurement report message, the downlink measurement report message and the another downlink measurement report message.

10. A backhaul device for a mobile communication system, the mobile communication system comprising the backhaul device, a UE, a D2D UE, and a BS and defining an uplink resource and a downlink resource, the uplink resource being used by the UE and the D2D UE for an uplink signal transmission, the downlink resource being used by the BS for a downlink signal transmission, the D2D UE being capable of D2D transmission through the uplink resource, the UE being incapable of the D2D transmission through the uplink resource, the D2D UE being near to the UE, and the BS connecting to the backhaul device, the backhaul device comprising:

a network unit connecting to the BS;
a processing unit, being configured to generate a measurement request message and enable the network unit to transmit the measurement request message to the BS so that the BS generates a first signal transmitting request message according to the measurement request message and transmits the first signal transmitting request message to the UE;
wherein the first signal transmitting request message indicates a first uplink resource region of the uplink resource so that the UE transmits a first uplink reference signal and the D2D UE receives and measures the first uplink reference signal to generate a first D2D uplink measurement report message;
wherein the network unit further receives the first D2D uplink measurement report message from the D2D UE, and the processor further decides the location information of at least one of the UE and the D2D UE according to the first D2D uplink measurement report message.

11. The backhaul device of claim 10, wherein the processing unit further selects the D2D UE so that the D2D UE receives an uplink measurement request message and measures the first uplink reference signal transmitted by the UE according to the uplink measurement request message to generate the first D2D uplink measurement report message.

12. The backhaul device of claim 11, wherein when the mobile communication system further comprises another D2D UE near to the UE, the processing unit further selects the another D2D UE so that the another D2D UE receives the uplink measurement request message, measures the first uplink reference signal transmitted by the UE according to the uplink measurement request message to generate a second D2D uplink measurement report message and transmits the second D2D uplink measurement report message to the backhaul device, and the backhaul device further decides the location information of at least one of the UE and the D2D UE according to the first D2D uplink measurement report message and the second D2D uplink measurement report message.

13. The backhaul device of claim 10, wherein the processing unit further generates a first uplink measurement request message and enables the network unit to transmit the first uplink measurement request message to the BS so that the BS measures the first uplink reference signal according to the first uplink measurement request message to generate a first BS uplink measurement report message and transmits the first BS uplink measurement report message to the network interface, and the processing unit further decides the location information of at least one of the UE and the D2D UE according to the first D2D uplink measurement report message and the first BS uplink measurement report message;

wherein when the mobile communication system further comprises another BS near to the UE, the processing unit further enables the network unit to transmit the first uplink measurement request message to the another BS so that the another BS measures the first uplink reference signal according to the first uplink measurement request message to generate a second BS uplink measurement report message and transmits the second BS uplink measurement report message to the network interface, and the processing unit further decides the location information of at least one of the UE and the D2D UE according to the first D2D uplink measurement report message, the first BS uplink measurement report message and the second BS uplink measurement report message.

14. The backhaul device of claim 13, wherein when the D2D UE is near to the BS or when the mobile communication system further comprises the another BS near to the D2D UE, the D2D UE further receives a second signal transmitting request message which indicates a second uplink resource region of the uplink resource so that the D2D UE transmits a second uplink reference signal via the second uplink resource region;

wherein when the D2D UE is near to the BS, the processing unit further generates a second uplink measurement request message and enables the network unit to transmit the second uplink measurement request message to the BS so that the BS measures the second uplink reference signal according to the second uplink measurement request message to generate a third BS uplink measurement report message and transmits the third BS uplink measurement report message to the network unit, and the processing unit further decides the location information of at least one of the UE and the D2D UE according to the first D2D uplink measurement report message, the first BS uplink measurement report message and the third BS uplink measurement report message;

wherein when the D2D UE is near to the BS and the mobile communication system further comprises the another BS near to the UE, the processing unit further decides the location information of at least one of the UE and the D2D UE according to the first D2D uplink measurement report message, the first BS uplink measurement report message, the second BS uplink measurement report message and the third BS uplink measurement report message;

wherein when the mobile communication system further comprises the another BS near to the D2D UE, the processing unit further enables the network unit to transmit the second uplink measurement request message to the another BS so that the another BS measures the second uplink reference signal according to the second uplink measurement request message to generate a fourth BS uplink measurement report message and transmits the fourth BS uplink measurement report message to the network unit, and the processing unit further decides the location information of at least one of the UE and the D2D UE according to the first D2D uplink measurement report message, the first BS uplink measurement report message and the fourth BS uplink measurement report message;

wherein when the mobile communication system further comprises the another BS near to the UE and the D2D UE, the processing unit further decides the location information of at least one of the UE and the D2D UE according to the first D2D uplink measurement report message, the first BS uplink measurement report message, the second BS uplink measurement report message and the fourth BS uplink measurement report message;

wherein when the D2D UE is near to the BS and the mobile communication system further comprises the another BS near to the UE and the D2D UE, the processing unit further decides the location information of at least one of the UE and the D2D UE according to the first D2D uplink measurement report message, the first BS uplink measurement report message, the second BS uplink measurement report message, the third BS uplink measurement report message and the fourth BS uplink measurement report message.

15. The backhaul device of claim 10, wherein when the mobile communication system further comprises another UE near to the D2D UE, the another UE receives a signal transmitting request message which indicates an uplink resource region of the uplink resource so that the another UE transmits an uplink reference signal via the uplink resource region, the D2D UE further receives the uplink reference signal from the uplink resource region, measures the uplink reference signal to generate a D2D uplink measurement report message and transmits the D2D uplink measurement report message to the backhaul device so that the backhaul device further decides the location information of at least one of the UE and the D2D UE according to the first D2D uplink measurement report message and the D2D uplink measurement report message.

16. The backhaul device of claim 15, wherein when the mobile communication system further comprises another D2D UE near to the another UE, the processing unit further selects the another D2D UE so that the another D2D UE receives an uplink measurement request message, measures the uplink reference signal transmitted by the another UE according to the uplink measurement request message to generate another D2D uplink measurement report message and transmits the another D2D uplink measurement report message to the backhaul device, and the backhaul device further decides the location information of at least one of the UE and the D2D UE according to the first D2D uplink measurement report message, the D2D uplink measurement report message and the another D2D uplink measurement report message.

17. The backhaul device of claim 10, wherein when the mobile communication system further comprises another D2D UE near to the D2D UE, the processing unit further selects the another D2D UE so that the another D2D UE receives a signal transmitting request message, the signal transmitting request message indicates an uplink resource region of the uplink resource so that the another D2D UE transmits an uplink reference signal via the uplink resource region, and the D2D UE further receives the uplink reference signal from the uplink resource region, measures the uplink reference signal to generate a D2D uplink measurement report message, and transmits the D2D uplink measurement report message to the backhaul device so that the backhaul device further decides the location information of at least one of the UE and the D2D UE according to the first D2D uplink measurement report message and the D2D uplink measurement report message.

18. The backhaul device of claim 10, wherein the BS further transmits a downlink reference signal according to the measurement request message, and the processing unit further generates a downlink measurement request message and enables the network unit to transmit the downlink measurement request message to the UE so that the UE measures the downlink reference signal according to the downlink measurement request message to generate a downlink measurement report message and transmits the downlink measurement report message to the network unit, and the processing unit further decides the location information of at least one of the UE and the D2D UE according to the first D2D uplink measurement report message and the downlink measurement report message;

wherein when the D2D UE is near to the BS, the processing unit further enables the network unit to transmit the downlink measurement request message to the D2D UE so that the D2D UE measures the downlink reference signal according to the downlink measurement request message to generate a D2D downlink measurement report message and transmits the D2D downlink measurement report message to the network unit, and the processing unit further decides the location information of at least one of the UE and the D2D UE according to the first D2D uplink measurement report message, the downlink measurement report message and the D2D downlink measurement report message.

19. The backhaul device of claim 18, wherein when the mobile communication system further comprises another BS near to the UE, the network unit further transmits another measurement request message to the another BS so that the another BS transmits another downlink reference signal according to the another measurement request message, the UE further receives the another downlink reference signal from the another BS, measures the another downlink reference signal to generate another downlink measurement report message, and transmits the another downlink measurement report message to the network unit so that the processing unit further decides the location information of at least one of the UE and the D2D UE according to the first D2D uplink measurement report message, the downlink measurement report message and the another downlink measurement report message;

wherein when the mobile communication system further comprises the another BS near to the UE and the D2D UE is near to the BS, the processing unit further decides the location information of at least one of the UE and the D2D UE according to the first D2D uplink measurement report message, the downlink measurement report message, the another downlink measurement report message and the D2D downlink measurement report message;

wherein when the mobile communication system further comprises the another BS near to the UE and the D2D UE, the network unit further transmits the another measurement request message to the D2D UE so that the D2D UE further receives the another downlink reference signal from the another base station, generates another D2D downlink measurement report message and transmits the another D2D downlink measurement report message to the network unit, and the processing unit further decides that location information of at least one of the UE and the D2D UE according to the first D2D uplink measurement report message, the downlink measurement report message, the another downlink measurement report message and the another D2D downlink measurement report message; and wherein when the mobile communication system further comprises the another BS near to the UE and the D2D UE and the D2D UE is near to the BS, the processing unit further decides the location information of at least one of the UE and the D2D UE according to the first D2D uplink measurement report message, the downlink measurement report message, the another downlink measurement report message, the D2D downlink measurement report message and the another D2D downlink measurement report message.

20. A positioning method for use in a backhaul device, the backhaul device being used in a mobile communication system, the mobile communication system comprising the backhaul device, a UE, a D2D UE, and a BS and defining an uplink resource and a downlink resource, the uplink resource being used by the UE and the D2D UE for an uplink signal transmission, the downlink resource being used by the BS for a downlink signal transmission, the D2D UE being capable of D2D transmission through the uplink resource, the UE being incapable of the D2D transmission through the uplink resource, the UE being near to the D2D UE, the BS connecting to the backhaul device, the backhaul device comprising a network unit and a processing unit, and the network unit being configured to connect to the BS, the positioning method being executed by the processing unit and comprising:

generating a measurement request message;

the network unit transmitting the measurement request message to the BS so that the BS generates a first signal transmitting request message according to the measurement request message and transmits the first signal transmitting request message to the UE, wherein the first signal transmitting request message indicates a first uplink resource region of the uplink resource so that the UE transmits a first uplink reference signal according to the first signal transmitting request message and the D2D UE receives and measures the first uplink reference signal to generate a first D2D uplink measurement report message;

receiving the first D2D uplink measurement report message from the D2D UE via the network unit; and deciding the location information of at least one of the UE and the D2D UE according to the first D2D uplink measurement report message.

* * * * *